(12) United States Patent
Takano et al.

(10) Patent No.: US 8,351,711 B2
(45) Date of Patent: Jan. 8, 2013

(54) FACE CATEGORIZING METHOD, FACE CATEGORIZING APPARATUS, CATEGORIZATION MAP, FACE CATEGORIZING PROGRAM, AND COMPUTER-READABLE MEDIUM STORING PROGRAM

(75) Inventors: Ruriko Takano, Tokyo (JP); Noriko Okubo, Tokyo (JP); Sawako Yuri, Tokyo (JP); Ken Hosoya, Tokyo (JP); Yuko Ishikawa, Tokyo (JP); Hiroyo Usuki, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 1024 days.

(21) Appl. No.: 12/095,507

(22) PCT Filed: Nov. 29, 2006

(86) PCT No.: PCT/JP2006/323781
§ 371 (c)(1),
(2), (4) Date: Jun. 20, 2008

(87) PCT Pub. No.: WO2007/063878
PCT Pub. Date: Jun. 7, 2007

(65) Prior Publication Data
US 2010/0220933 A1 Sep. 2, 2010

(30) Foreign Application Priority Data
Dec. 1, 2005 (JP) .................................. 2005-348320

(51) Int. Cl.
*G06K 9/62* (2006.01)
*G06K 9/00* (2006.01)
(52) U.S. Cl. ........................................ 382/224; 382/118
(58) Field of Classification Search ........................ None
See application file for complete search history.

(56) References Cited

U.S. PATENT DOCUMENTS
6,091,836 A * 7/2000 Takano et al. ................. 382/118

FOREIGN PATENT DOCUMENTS
| CN | 1179293 A | 4/1998 |
|----|-----------|--------|
| EP | 0828230 | 3/1998 |
| EP | 0961225 | 12/1999 |
| EP | 1496465 | 1/2005 |
| JP | 10-075823 | 3/1998 |
| JP | 10-289303 | 10/1998 |
| JP | 11-009338 | 1/1999 |
| JP | 2001-224430 | 8/2001 |

OTHER PUBLICATIONS

"Characteristics of Average Faces" by Mlwa Nishitani et al. 63rd Annual Meeting of The Japanese Psychological Association; p484; Aug. 1999, Japan, with English abst.
Extended European Search Report dated Mar. 17, 2009.
Chinese Office Action mailed Dec. 31, 2010.

* cited by examiner

*Primary Examiner* — Matthew Bella
*Assistant Examiner* — Fred Hu
(74) *Attorney, Agent, or Firm* — IPUSA, PLLC

(57) ABSTRACT

A face categorizing apparatus for categorizing contours of a face of an examined subject is disclosed that includes image capturing means for capturing a face image of the face of the examined subject; control means for controlling operations for categorizing the face of the captured face image into one of at least four predetermined types of categories based on at least two indices including facial space and facial depth/bone structure/fleshiness; and indication means for indicating a categorization result of categorizing the face by the control means on a map having the four predetermined types of categories positioned at corresponding quadrants of a plane coordinate system.

14 Claims, 25 Drawing Sheets

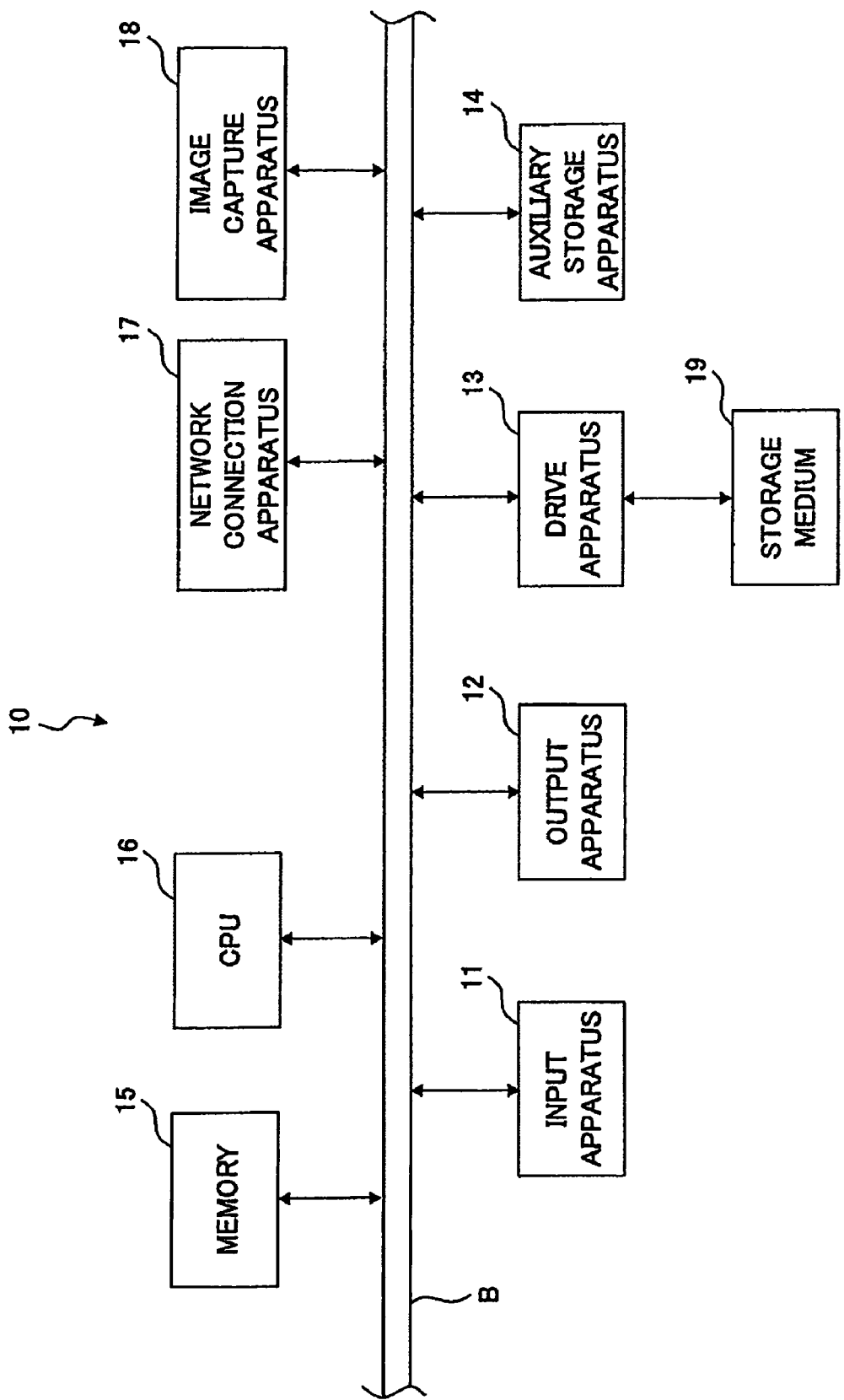

FIG.2A

| ◆face shape | ◆face line | ◆forehead |
|---|---|---|
| octagon | angular face line | <depth/height> |
| | →sharp face line | flat forehead |
| home base | | level forehead |
| angular home base | narrower face line toward chin | curved forehead |
| short home base | smooth face line | linear forehead |
| | | prominent forehead |
| triangle | oval face line | smooth forehead |
| (inverted triangle) | balanced face line | even forehead |
| (triangle) | | |
| (round) | long face line in perspective view | →forehead contour prominent flat smooth |
| rectangle | | |
| square | S-shaped jaw line in perspective view | <size/width> |
| diamond shape | | large forehead |
| oval shape | fleshy side face | small forehead |
| long | →obscure face line | wide forehead |
| | | laterally narrow forehead |
| angular | side width | laterally wide forehead |
| angular face | lengthy side lines | vertically narrow forehead |
| bony face | laterally wide strikingly wide | |
| | | <shape> |
| round | | round forehead |
| | | high forehead |
| protruding jaws | | round forehead contour |
| squared-jaw | | rounded forehead |
| prominent jaws | | |
| | | |
| small face | | |
| long face | | |
| short face | | |
| | | |
| | | |
| | | |
| | | |

FIG.2B

| ◆Eyes | ◆Nose | ◆cheeks | ◆lips |
|---|---|---|---|
| <depth/height> | <depth/height> | <upper cheeks, cheek bones> | <depth/height> |
| prominent eyebrow arch | high nose | Protruding cheeks | Protruding lips |
| | low nose | Protruding forehead bone | Pudgy lips |
| protruding eyebrow arch bone | linear nose | Cheek bones | Lines formed under lips |
| brow eclipse | straight nose | Protruding cheek bones | |
| →brow-nose line linear curved | flared nose | Prominent cheek bones | Pudgy at sides of lips |
| deep set eyes | | Laterally protruding cheek bones | |
| (prominently deep set eyes) | <bone/flesh> | Open cheek bones | <shape> |
| prominent eye bags | prominent nose | Prominently protruding cheek bones | thick lips |
| well fleshed eyelids | heavily built nose | Laterally extending | thin lips |
| | prominent nose bridge | | |
| puffy eyelids | pudgy nose | <lower cheeks> | tense lips |
| swollen eyelids | round nose | flat lower cheeks | accentuated lips |
| | thin nose | plump lower cheeks | |
| | (wide nose) | pudgy lower cheeks | |
| vertically wide eyelids | | fleshy lower cheeks | |
| not-so-wide eyelids | <shape> | cheek pouches | |
| narrow eyelids | key shape | | |
| wide eyelids | dumpling nose | <fleshiness/volume> | |
| | round nose | fair-fleshed | |
| | long nose | well-fleshed | |
| | short nose | meager-fleshed | |
| | wide nose | pudgy | |
| | laterally wide nose | plump | |
| | side width | thin-fleshed | |
| | round hook nose | hollow cheeks | |
| | large nose | refined cheeks | |
| | round nose line | slender cheeks | |
| | small nose hole | baby cheeks | |
| | well-shaped nose | | |
| | | <protruding shape> | |
| | | flat | |
| | | not pudgy | |
| | | protruding | |
| | | flat front face | |
| | | accentuated | |

FIG.3

FACIAL CONTOUR EVALUATION SHEET

◆ CIRCLE CORRESPONDING FACE SHAPE

| oval | round | long | inverted triangle | triangle | square | diamond | home base | octagon |
|------|-------|------|-------------------|----------|--------|---------|-----------|---------|
| ○ | ○ | ○ | ▽ | △ | □ | ◇ | ⌂ | ⬡ |

◆ SHAPE
- angular +++++++ round
- protruding jaw +++++++ non-protruding jaw

◆ FACE LINE
- sharp +++++++ obscure
- smooth +++++++ not smooth

◆ CHIN
- large +++++++ small
- long +++++++ short
- wide +++++++ narrow
- protruding +++++++ receding
- delicate +++++++ prominent
- pointed lower chin +++++++ flat
- round jaw line +++++++ angular
- refined jaw line +++++++ unrefined ◆ FOREHEAD
- wide +++++++ narrow ◆ EYES
- brow-nose contour linear +++++++ curved
- eyelid fleshiness thick +++++++ thin
- eyelids wide +++++++ narrow
- eyelids deep set +++++++ shallow
- under eyes deep set +++++++ shallow
- brow arch bone protruding +++++++ not protruding ◆ NOSE
- large +++++++ small
- high +++++++ low
- long +++++++ short
- round +++++++ linear
- wide +++++++ narrow
- thick bridge +++++++ thin
- straight +++++++ not straight
- flared +++++++ not flared ◆ CHEEKS
- fleshy +++++++ bony
- pudgy +++++++ refined
- wide +++++++ narrow
- long +++++++ short
- laterally wide +++++++ narrow
- cheek bones flared sideways +++++++ not flared
- cheek bones protruding +++++++ not protruding
- lower cheeks fleshy +++++++ not fleshy
- cheek protrusions accentuated +++++++ not accentuated
- cheek protrusions smooth +++++++ not smooth
- cheek centers above nose +++++++ flat protruding below nose ◆ LIPS
- protruding +++++++ not protruding ◆ OVERALL
- fleshy +++++++ bony
- contour accentuated +++++++ not accentuated
- chiseled +++++++ flat
- smooth +++++++ rough
- continuous +++++++ not continuous

FIG.7

|  | DEPTH | FLESH/BONE STRUCTURE | WIDTH | HEIGHT |
|---|---|---|---|---|
|  | Factor 1 | Factor 2 | Factor 3 | Factor 4 |
| nose base line high-low | 0.943 | -0.118 | -0.275 | 0.075 |
| smooth-rough | -0.785 | 0.047 | -0.342 | 0.098 |
| chiseled-flat | 0.751 | 0.100 | -0.107 | -0.225 |
| nose high-low | 0.582 | 0.242 | -0.109 | -0.109 |
| nose line straight-not | 0.483 | 0.279 | -0.280 | 0.274 |
| cheek bones protruding forward-not | 0.479 | -0.150 | 0.247 | -0.282 |
| eyelids puffy-not | -0.421 | 0.048 | -0.107 | -0.192 |
| cheek bones flared sideways-not | 0.420 | 0.186 | 0.265 | -0.159 |
| forehead-to-nose line straight-curved | 0.370 | -0.144 | 0.149 | 0.254 |
| cheeks sagging-not | 0.473 | -0.922 | 0.108 | 0.181 |
| cheeks pudgy-refined | -0.114 | -0.879 | -0.110 | -0.066 |
| fleshy-bony | -0.184 | -0.783 | -0.363 | -0.067 |
| face line refined-unrefined | 0.107 | 0.732 | 0.009 | 0.190 |
| cheek protrusions above-below | -0.148 | 0.425 | 0.085 | -0.408 |
| nose long-short | 0.163 | 0.417 | -0.310 | 0.318 |
| jaws flared-not | 0.096 | 0.146 | 0.845 | -0.052 |
| face line angular-round | 0.123 | 0.314 | 0.808 | -0.010 |
| cheeks wide-narrow | -0.120 | -0.368 | 0.787 | 0.217 |
| chin protruding-receding | -0.349 | 0.031 | 0.767 | 0.101 |
| chin ling-short | 0.038 | 0.082 | 0.012 | 0.917 |
| cheeks long-short | -0.192 | 0.070 | -0.043 | 0.826 |
| chin large-small | -0.042 | 0.075 | 0.367 | 0.718 |

FIG.12

A. APPEARANCE
- (1) FOREHEAD WIDTH
- (2) FOREHEAD DEPTH
- (3) NOSE LINE
- (4) CHEEK FLESHINESS
- (5) CHEEK LENGTH
- (6) FACE LINE
- (7) CHIN PROTRUSION
- (8) EYES-NOSE BALANCE

B. OVERALL IMPRESSION
- (1) FACIAL DEPTH
- (2) BEAUTY
- (3) ATTRACTIVENESS

APPROPRIATENESS OF EACH ITEM
APPROPRIATE · NEITHER · INAPPROPRIATE

| | | | | | APPROPRIATENESS |
|---|---|---|---|---|---|
| 1) FOREHEAD WIDTH | NARROW 1 | RATHER NARROW 2 | NEITHER 3 | RATHER WIDE 4 | WIDE 5 ⇨ 1.APPROPRIATE 2.NEITHER 3.INAPPROPRIATE |
| 2) FOREHEAD DEPTH | FLAT 1 | RATHER FLAT 2 | NEITHER 3 | RATHER ROUND 4 | ROUND 5 ⇨ 1.APPROPRIATE 2.NEITHER 3.INAPPROPRIATE |

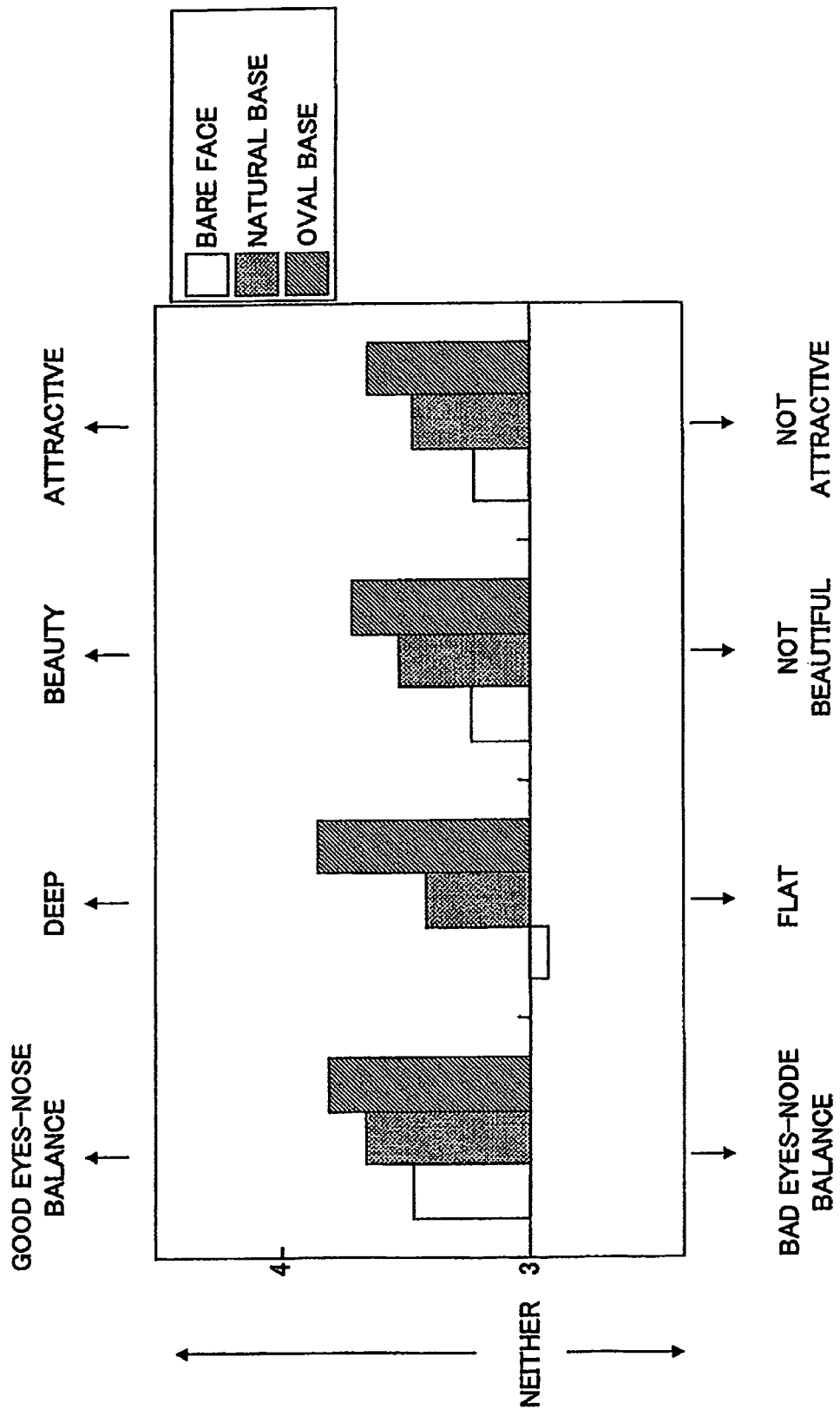

FIG.23
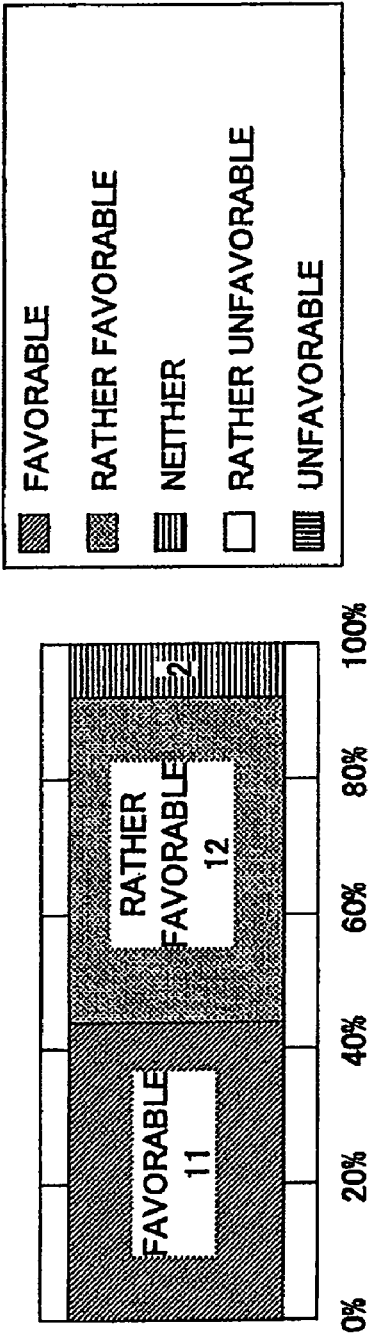
(a) FAVORABILITY
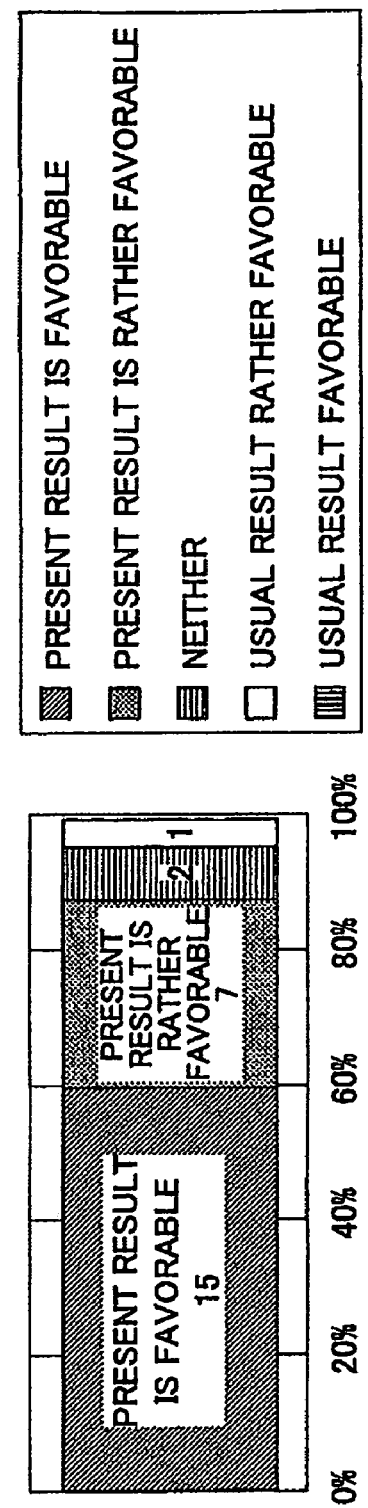
(b) COMPARISON TO USUAL RESULT

FACE CATEGORIZING METHOD, FACE CATEGORIZING APPARATUS, CATEGORIZATION MAP, FACE CATEGORIZING PROGRAM, AND COMPUTER-READABLE MEDIUM STORING PROGRAM

TECHNICAL FIELD

The present invention relates to a face categorizing method, a face categorizing apparatus, a categorization map, a face categorizing program, and a computer-readable medium storing such a program for accurately categorizing contours of the face.

BACKGROUND ART

Makeup techniques for defining contours and the bone structure/fleshiness of the face include highlighting and shading to emphasize facial features. For example, in order to give the appearance of a higher nose, the nose line may be highlighted and the side lines of the nose may be shaded. Also, cheeks may be shaded in order to minimize fullness of the face line, for example. Also, puffy eyelids may be shaded in order to give the appearance of deep set eyes, for example.

It is noted that techniques are disclosed for categorizing the facial features of an examined face according to its characteristics and providing guidelines for makeup application based on a category type into which the examined face is categorized (e.g., see Japanese Laid-Open Patent Publications No. 2001-224430 and No. 10-289303).

However, according to the makeup techniques disclosed above, contours and shades of the face may be overemphasized and the overall balance of the finished result may not be optimal. Also, the above-disclosed makeup technique relates to applying makeup to certain portions of the face such as the nose or the eyes and does not take into consideration the overall contours of the face.

Accordingly, an accurate index for evaluating the overall contours of individual faces and a technique for adjusting overall contours of the face are in demand. It is noted that the above disclosures propose the use of a categorization map as an index; however, such maps are not directed to evaluating the overall contours of the face.

DISCLOSURE OF THE INVENTION

According to certain aspects of the present invention, a face categorizing method, a face categorizing apparatus, a categorization map, a face categorizing program, and a computer-readable medium storing such a program are provided for accurately categorizing contours of the face.

According to one embodiment of the present invention, a face categorizing method for categorizing contours of a face of an examined subject is provided, the method including:

an evaluation step of evaluating the face of the examined subject based on at least two indices including facial space and overall facial depth/bone structure/fleshiness;

a categorization step of categorizing the face of the examined subject into one of at least four predetermined types of categories based on a result of the evaluation made by the evaluation step.

According to an aspect of the present embodiment, contours of a face may be accurately categorized based on at least two indices including facial space and overall facial depth/bone structure/fleshiness.

In one preferred embodiment of the present invention, the evaluation step includes using a predetermined average face and at least four representative faces each representing said at least four predetermined types of categories for evaluating the face of the examined subject.

According to an aspect of the present embodiment, by using a predetermined average face and four representative faces each representing four predetermined types of categories, evaluation accuracy may be improved, and evaluation may be easily and efficiently performed.

In another preferred embodiment of the present invention, the evaluation step includes evaluating a scale of a length-to-width ratio of the facial space reflecting a length-to-width balance of a forehead, cheeks, or a chin of the face with respect to the average face; and evaluating the facial depth/bone structure/fleshiness by determining a scale of how refined and sharp or how plump and soft the face appears.

According to an aspect of the present embodiment, contours may be evaluated using suitable scales.

In another preferred embodiment of the present invention, the face categorizing method may further include an indication step of indicating a categorization result of categorizing the face by the categorization step on a map having the four types of categories positioned at corresponding quadrants of a plane coordinate system, and indicating an adjustment method for each of the four types of categories for adjusting contours to resemble contours of a predetermined average face using makeup.

According to an aspect of the present embodiment, by indicating an adjustment method for adjusting contours using makeup, a method of applying makeup may be easily determined.

In another preferred embodiment of the present invention, the adjustment method uses a shape having a width-to-length ratio of 1:1.35-1.45 which shape is similar to an outer shape of the average face and is scaled down by a predetermined scale factor.

According to an aspect of the present embodiment, by adjusting the appearance of the space and the depth/bone structure/fleshiness of the face with makeup so that an inner face line that is similar in shape to the outer shape of an average face may stand out, desirable contours may be obtained.

According to another embodiment of the present invention, a face categorizing apparatus for categorizing contours of a face of an examined subject is provided, the apparatus including:

image capturing means for capturing a face image of the face of the examined subject;

control means for controlling operations for categorizing the face of the captured face image into one of at least four predetermined types of categories based on at least two indices including facial space and overall facial depth/bone structure/fleshiness; and indication means for indicating a categorization result of categorizing the face by the control means on a map having the four predetermined types of categories positioned at corresponding quadrants of a plane coordinate system.

According to an aspect of the present embodiment, contours of a face may be accurately categorized based on at least two indices including facial space and overall facial depth/bone structure/fleshiness.

In one preferred embodiment of the present invention, the control means uses a predetermined average face and at least four representative faces each representing said at least four predetermined types of categories for categorizing the face of the examined subject.

According to an aspect of the present embodiment, by using a predetermined average face and four representative faces each representing four predetermined types of categories, evaluation accuracy may be improved, and evaluation may be easily and efficiently performed.

In another preferred embodiment of the present invention, the control means evaluates a scale of a length-to-width ratio of the facial space reflecting a length-to-width balance of a forehead, cheeks, or a chin of the face with respect to the average face; and evaluates the facial depth/bone structure/fleshiness by determining a scale of how refined and sharp or how plump and soft the face appears.

According to an aspect of the present embodiment, contours may be evaluated using suitable scales.

In another preferred embodiment of the present invention, the indication means indicates an adjustment method for each of the four types of categories for adjusting contours to resemble contours of a predetermined average face using makeup according to the categorization result.

According to an aspect of the present embodiment, by indicating an adjustment method for adjusting contours using makeup, a method of applying makeup may be easily determined.

In another preferred embodiment of the present invention, the adjustment method uses a shape having a width-to-length ratio of 1:1.35-1.45 which shape is similar to an outer shape of the average face and is scaled down by a predetermined scale factor.

According to an aspect of the present embodiment, by adjusting the appearance of the space and the depth/bone structure/fleshiness of the face with makeup so that an inner face line that is similar in shape to the outer shape of an average face may stand out, desirable contours may be obtained.

According to another embodiment of the present invention, a face categorization map is provided that includes a first axis representing face types according to facial space; a second axis representing face types according to overall facial depth/bone structure/fleshiness; and a coordinate system having quadrants divided by the first and second axes, and a predetermined face image having standard and ideal contours arranged at a center where the first and second axes intersect.

According to an aspect of the present embodiment, contours of a face may be accurately categorized based on at least two indices including facial space and overall facial depth/bone structure/fleshiness.

In one preferred embodiment of the present invention, the first axis represents a scale of a length-to-width ratio of the facial space reflecting a length-to-width balance of a forehead, cheeks, or chin of the face with respect to a predetermined average face; and the second axis represents, in one direction, a scale of how refined and sharp the face appears; and, in another direction, a scale of how plump and soft the face appears with respect to the facial depth/bone structure/fleshiness.

According to an aspect of the present embodiment, contours may be evaluated using suitable scales.

In another preferred embodiment of the present invention, a corresponding adjustment method for adjusting contours to resemble contours of the predetermined face image using makeup is indicated at each of the quadrants that are divided by the first and second axes.

According to an aspect of the present embodiment, by adjusting the appearance of the space and the depth/bone structure/fleshiness of the face using the categorization map, makeup may be applied to show desirable contours.

According to another embodiment of the present invention, a face categorizing program is provided that causes a computer to execute a face categorizing method according to an embodiment of the present invention.

According to an aspect of the present embodiment, contours of a face may be accurately categorized. Also, a face categorization method according to an embodiment of the present invention may be easily performed by a general purpose computer, for example, by installing the program according to the present embodiment.

According to another embodiment of the present invention, a computer-readable medium is provided that stores a face categorizing program according to an embodiment of the present invention.

According to an aspect of the present invention, a face categorizing program according to an embodiment of the present invention may be easily installed in plural computers using the computer-readable medium according to the present embodiment. Also, a face categorization method according to an embodiment of the present invention may be easily performed by a general purpose computer, for example, by installing the program stored in the computer-readable medium according to the present embodiment.

BRIEF DESCRIPTION OF THE DRAWINGS

FIG. 1 is a diagram showing an exemplary configuration of a face categorizing apparatus according to an embodiment of the present invention;

FIG. 2A is a table indicating exemplary samples of words expressing facial traits conceived from face photographs;

FIG. 2B is a table indicating other exemplary samples of words expressing facial traits conceived from face photographs;

FIG. 3 is a diagram showing an exemplary facial contour evaluation sheet for evaluating facial contours;

FIG. 7 is a table illustrating factor loading of contour evaluation factors;

FIG. 12 is a diagram showing exemplary evaluation items with regard to the appearance and overall impression of the face;

FIG. 13 is a diagram showing exemplary evaluations on the appearance of the face;

FIG. 23 is a diagram showing exemplary evaluations on makeup results made by subjects.

BEST MODE FOR CARRYING OUT THE INVENTION

Figure 4:
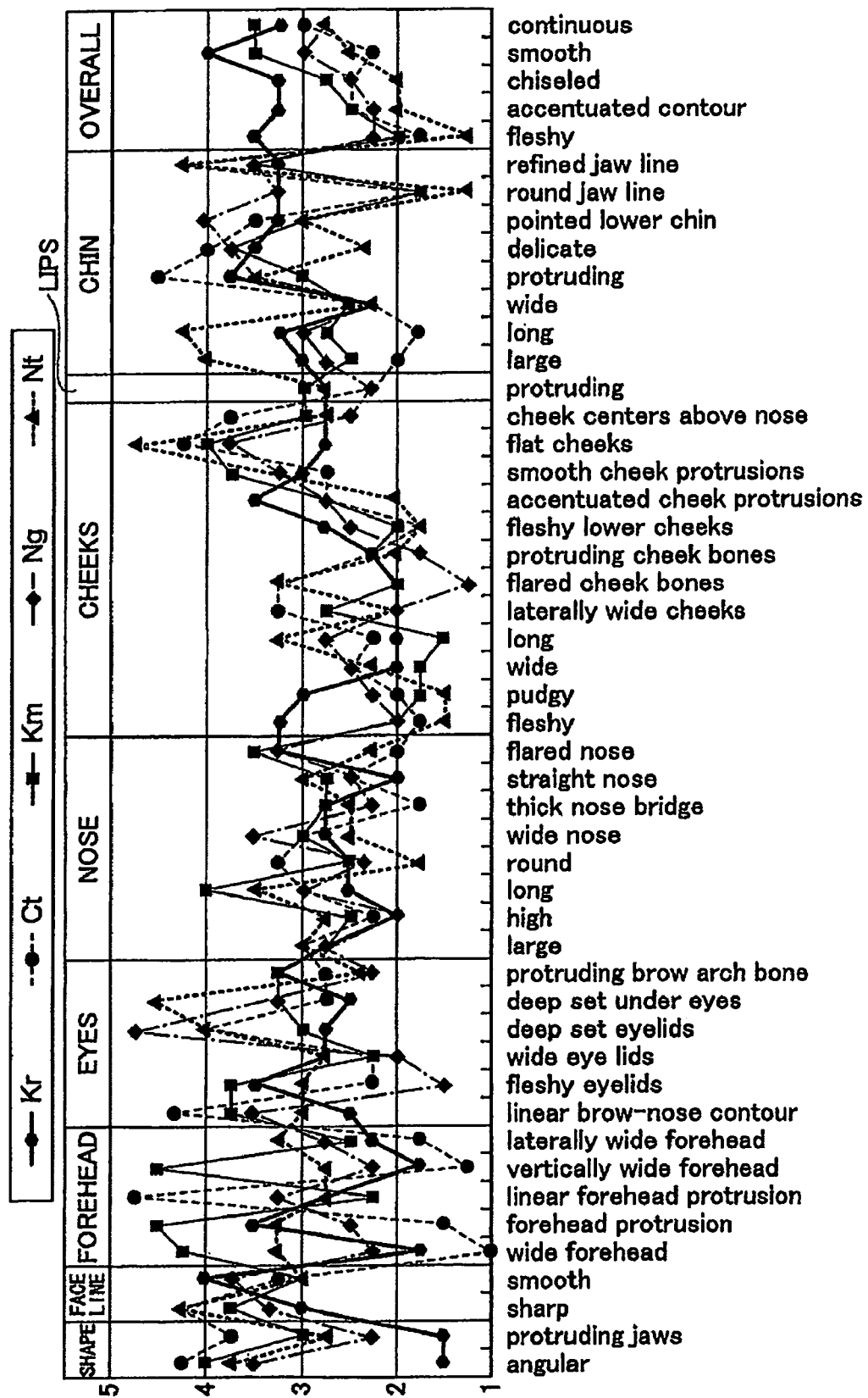
FIG. 4 is a graph showing exemplary average evaluations obtained for each individual subject.

In the following, preferred embodiments of the present invention are described with reference to the accompanying drawings.

<General Summary>

An embodiment of the present invention relates to a technique using the beneficial effects of adjusting facial contours with makeup to enhance beauty. It provides a technique for evaluating facial contours of individual faces, categorizing the evaluation results based on a predetermined categorization map, and determining a suitable contour adjustment method according to the categorization result with relative ease and efficiency.

It is noted that facial space and facial depth/bone structure/fleshiness may be used as indices for conducting face evaluation and categorization according to an embodiment of the present invention. More specifically, a face may be evaluated and categorized depending on whether the spatial proportion of the face is long or short, and whether the depth/bone structure/fleshiness of the face is sharp and refined or plump and soft, for example. It is noted that facial depth/bone structure/fleshiness is a complex index combining the indices 'depth' and 'bone structure/fleshiness' that are correlated with each other. That is, a face may have greater depth when a face is bony (i.e., not fleshy) and have less depth when the face is not bony (i.e., fleshy). Accordingly, these indices have been combined based on the above correlation to express the above complex index.

Also, in one embodiment, representative face images may be provided at quadrants defined by two axes of the categorization map and a predetermined average face having standard and idealistic contours may be provided at the center of the categorization map where the two axes intersect so that evaluation accuracy may be improved and evaluation may be easily and efficiently performed.

In another embodiment, an adjustment method (tips) for adjusting facial contours with makeup that is determined beforehand for each different face type may be indicated in the facial contour categorization map. In this way, a suitable makeup application method for each category may be easily determined.

In another preferred embodiment, the so-called 'best oval adjustment method' is used for facial contour adjustment. It is noted that best oval refers to a face shape with a standard/ideal facial balance. Such a face shape is similar to a shape formed by combining two halves of superellipse shapes as the upper half of the face and the lower half of the face having differing curvatures, the shape being scaled at a predetermined scaling rate and having a length-to-width ratio of 1:1.4. It is noted that suitable makeup application with respect to facial contours may be enabled by adjusting the appearance of the facial depth and the facial depth/bone structure/fleshiness of the face to achieve this best oval shape based on the categorization map presented on a screen or paper, for example.

<Apparatus Structure>

In the following, an exemplary face categorizing apparatus is described for inputting evaluation information pertaining to the face of an examined subject, analyzing and determining the category to which the evaluation information belongs based on a categorization map that has been generated beforehand, and indicating the corresponding facial contour adjustment method to be used for adjusting facial contours with makeup. It is noted that the face categorizing apparatus described below may also be used to perform analysis processes pertaining to categorization map generation as is described below.

The face categorizing apparatus of the present embodiment may use a general purpose personal computer or a server to install execution programs (face categorizing program) that enable a computer to perform a face categorizing process according to an embodiment of the present invention, for example.

FIG. 1 is a block diagram showing an exemplary configuration of a face categorizing apparatus according to an embodiment of the present invention. The illustrated face categorizing apparatus 10 includes an input apparatus 11, an output apparatus 12, a drive apparatus 13, an auxiliary storage apparatus 14, a memory 15, a CPU (Central Processing Unit) 16 for controlling overall operations of the present apparatus, a network connection apparatus 17, and an image capture apparatus 18 that are interconnected by a system bus B.

The input apparatus 11 includes a pointing device such as a keyboard and a mouse that may be operated by a user, and inputs operation signals such as program execution signals that are issued by the user. The output apparatus 12 includes a display for indicating windows and data for enabling operation of the computer main frame and displaying program execution progress and results based on control programs executed by the CPU 16. The output apparatus 12 may also have a printer function, and in such a case, the output apparatus 12 may print out information such as the face categorization map, the face categorization result, and the suitable method for adjusting facial contours with makeup on a printing medium such as a sheet of paper so that the information may be provided to the examined subject.

In one embodiment, execution programs may be installed in the computer main frame via a storage medium 19 such as a CD-ROM. The storage medium 19 may be inserted into the drive apparatus 13 so that the programs stored in the storage medium 19 may be installed into the auxiliary storage apparatus 14 from the storage medium 19 via the drive apparatus 13. It is noted that the storage medium 19 is not limited to a CD-ROM and may be other various types of storage media that are configured to optically, electrically, or magnetically store information, such as a flexible disk, a magneto-optical disk, a semiconductor memory (e.g., a ROM or a flash memory).

The auxiliary storage unit 14 corresponds to storage means such as a hard disk, and is configured to store, input, and output programs and data including execution programs for executing processes according to embodiments of the present invention, control programs installed in the computer, image data such as average face image data, and evaluation information on the face of an examined subject, for example.

The CPU 16 is configured to control overall processes of the computer such as data input/output with various calculation units and hardware units based on control programs of an OS (Operating System) and execution programs stored in the memory 15 to perform face categorizing processes and related processes described below. Also, the CPU 16 may obtain from the auxiliary storage apparatus 14 information such as evaluation results of evaluating the face of an examined subject that may be necessary during program execution and information for displaying the categorization map on the output apparatus 12 and store results from program execution in the auxiliary storage apparatus 14.

The network connection apparatus 17 is connected to a communications network to obtain execution programs from other terminals connected to the communications network such as the Internet or a LAN (Local Area Network), and provide program execution results, execution programs, and other information to the other terminals, for example.

The image capture apparatus 18 may include a CCD (Charge Coupled Device) camera that captures a front face image of an examined subject and/or a perspective face image that is taken from a predetermined angle, for example. The captured image may be stored in the auxiliary storage apparatus 14 to be read as is necessary or desired to perform predetermined face categorizing processes for example.

As can be appreciated from the above descriptions, the face categorizing apparatus according to the present invention may perform face categorizing processes according to embodiments of the present invention. Also, it is noted that a general purpose personal computer may be used to perform the face categorizing processes according to embodiments of the present invention by installing execution programs for enabling the computer to execute such processes.

<Face Categorizing Method>

In the following, a face categorizing method and a categorization map used as a guideline for determining a method for adjusting facial contours with makeup according to embodiments of the present invention are described.

<1. Facial Contour Analysis and Categorization Method>
<1-1. Sample Gathering for Evaluation Word Extraction>

First, an index for categorizing individual faces is constructed. In order to examine expressions used to describe overall facial contours, face photographs of individuals with differing facial characteristics were gathered. Specifically, images of the faces of twenty-one female employees of a cosmetic company in their 20s through 40s captured from the front and from a 45-degree angle were gathered as samples.

<1-2. Prior Considerations for Construction of Analysis Index>
<1-2-1. Common Understanding in the Recognition of Contours>

According to an embodiment of the present embodiment, individual faces are evaluated and categorized according to the characteristic in their facial contours. Accordingly, the present embodiment is based on the premise that there is a common understanding with respect to recognition of facial contours. In this respect, four researchers were each assigned the task of grouping the face photographs that appeared to have similar facial contours based on their own judgment criteria and placing similar groups close to each other to determine whether a common perception exists among the researchers. It is noted that the samples of the face photographs of the twenty-one female employees were used in this examination.

The grouping results of the four researchers revealed that there were certain faces that were categorized into the same group by the different researchers, and even when certain faces were categorized into different groups by the researchers, the faces were usually placed at similar positions. Based on such findings, it was concluded that a common perception exists with respect to the evaluation of facial contours.

<1-2-2. Estimation of Evaluation Index>

Next, common traits of the face that were considered in grouping the face photographs were compiled and analyzed. As a result, it was found that traits such as 'fleshiness and boniness of the overall face', 'width and length of the face', 'shape of face line', and 'spatial proportion of forehead and cheeks' were considered in grouping the faces. It was also discovered that certain faces may be categorized as standard faces. The above findings were used as reference information for examining the consistency of the analysis results described below.

<1-3. Expression Words>
<1-3-1. Conception of Expression Words>

Next, expression words suitable for evaluating facial contours were contemplated. Specifically, each of the face photographs of the twenty-one female employees were reviewed by the four researchers to orally discuss and record particular remarks made for each face image primarily with regard to the facial contours and shades of the face. For example, remarks such as 'high nose', 'pudgy cheeks' and 'long face' were made. It is noted that in this oral discussion phase, remarks including those unrelated to facial contours were freely exchanged. FIGS. 2A and 2B are tables indicating exemplary samples of words expressing facial traits that were mentioned in connection with the face photographs. It is noted that 282 words were actually conceived and recorded during the above discussion.

Next, the recorded expression words were organized under certain elements according to their semantic content. It is noted that thirteen elements, namely, 'shape', 'face line', 'forehead', 'eyes', 'nose', 'cheeks', 'lips', 'chin', 'overall', 'space', 'eyes-nose-lips disposition', 'eyes-nose line' 'neck, etc.' were used in the present example. The semantic contents of the words were contemplated and similar words were compiled together as one word. Also, words that are not generally used to describe facial features and words that do not describe facial features including facial contours and shades were omitted. In this way, forty-nine adjective pairs related to the face shape and fleshiness of cheeks, for example, were selected as provisional evaluation words.

It is noted that at this point, suitable words for expressing facial contours are not yet known, and thereby, nine expression words describing the face type (facial feature) and face shape were also included. FIG. 3 is a diagram showing an exemplary facial contour evaluation sheet for evaluating facial contours.

It is noted that evaluation by the evaluation sheet of FIG. 3 may be performed by displaying the evaluation sheet on the display of the face categorizing apparatus 10 and having an operator such as an evaluator input predetermined evaluation information related to the face of an examined subject via the input apparatus 11, for example. In one embodiment, the evaluation information input operations may be performed using a pointing device such as a mouse and moving a cursor to the position of a predetermined evaluation item and selecting the item. However, the present invention is not limited to such input method, and data including evaluation information may be input in other various ways, such as input via a keyboard.

<1-3-2. Selection of Evaluation Words>

Next, the 49 adjective pairs and the nine face shape expression words were used to actually evaluate faces in order to determine the appropriateness of the evaluation words. It is noted that the sample of the face images of the twenty-one female employees were used in the evaluation, and nine individuals with faces that showed significant differences from each other with respect to the indices considered in <1-2-2. Estimation of Evaluation Index> were selected for actual examination and evaluation. First, the evaluation sheet of FIG. 3 was used by the four researchers to evaluate the faces of the nine individuals. It is noted that the evaluation was made on a scale of one to five with the median level (i.e., level 3) being a neutral evaluation (i.e., 'neither').

Next, the evaluation results were compiled and the average evaluation for each of the faces of the examined individuals was calculated. FIG. 4 is a graph showing a sample of average evaluations obtained for the faces of the examined individuals. Specifically, FIG. 4 shows the average evaluations obtained for five of the examined individuals (i.e., Kr, Ct, Km, Ng, and Nt). The evaluations, as is shown in FIG. 4, were performed for all of the examined individuals, and evaluation items for which substantially different evaluations were obtained depending on the faces of the individuals were given weight as important determining factors.

It was found that evaluation items having a large variation in score points depending on the faces of the individuals included the items 'angular/round' and 'sharp/obscure' for the face shape and face line; 'fleshiness of eyelids' and 'contour of brow-nose line (straight/curved)' for the eyes; 'long/short', 'round/linear', and 'flared/not flared' for the nose; 'fleshiness/boniness', 'flat/protruding', 'center above/below nose', and 'smoothness of cheek protrusions' for the cheeks; 'round/angular' for the chin; 'fleshiness/boniness' and 'smooth/rough' for the overall face; and 'wide/narrow forehead' and 'long/short chin' for evaluation of the facial space.

On the other hand, it was found that evaluation items for which differences in evaluations were slight for the different faces (i.e., evaluation items having little fluctuations in its value) included the items 'smoothness' for the face line; 'lateral width' for the forehead; 'brow arch bone' for the eyes; 'protruding' and 'width' for the chin; and 'chiseled/flat' for the overall face.

Accordingly, evaluation items were selected based on the above findings. Specifically, thirty-one adjective pairs and nine expressions describing different face shapes were determined to be effective evaluation factors for evaluating facial features and contours, and these factors were used in the subsequent evaluation and analyses.

<1-4. Correspondence Between Actual Face and Photograph Image>

Figure 5:
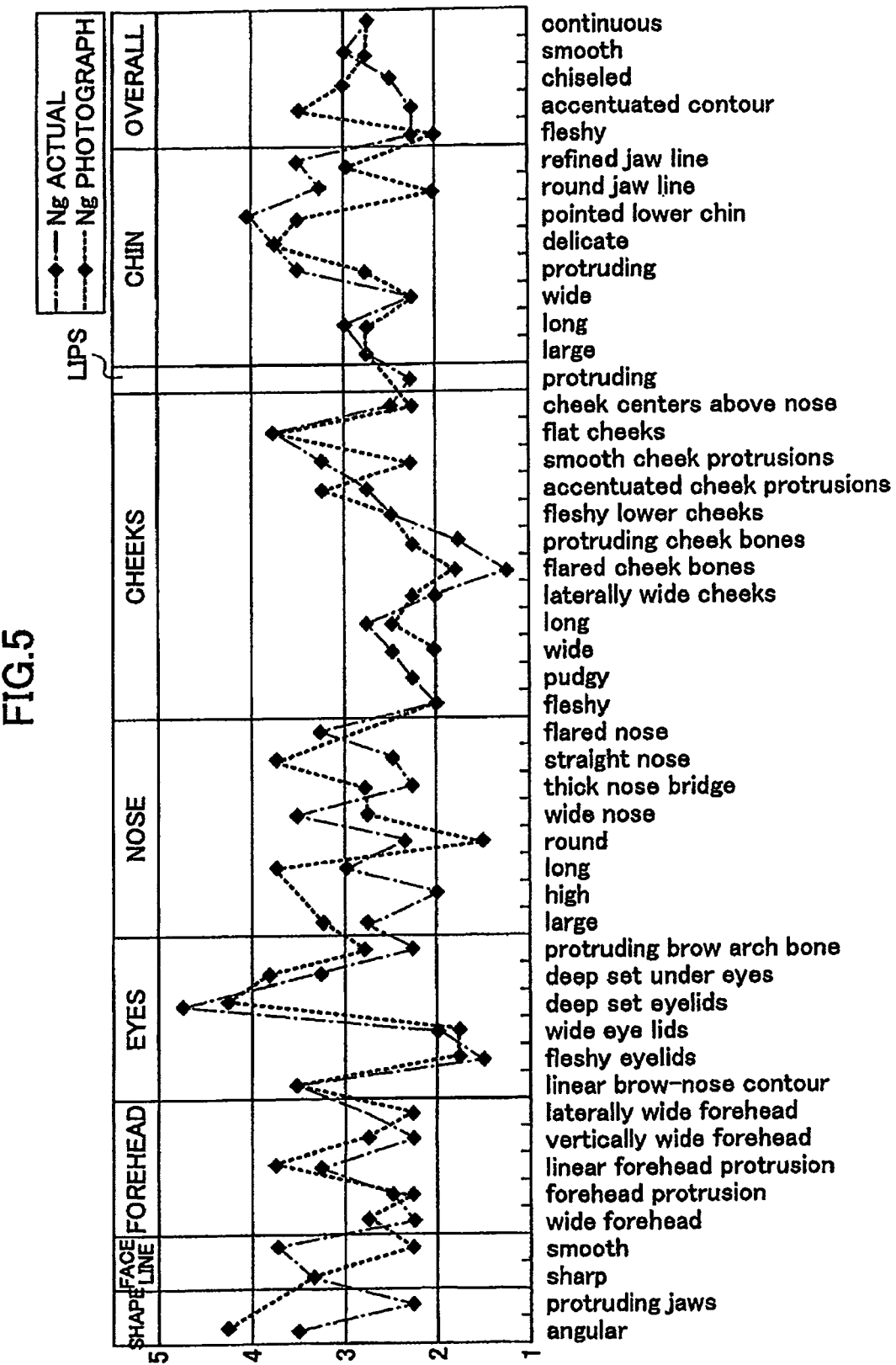
FIG. 5 is a graph showing examples of actual evaluations and photograph evaluations.

It is noted that consideration was also made with regard to the correspondence between evaluation of the actual face and the evaluation of the photograph image of the face. Specifically, the same four researchers performed evaluations using photographs of the nine individuals that were subject to actual evaluation. FIG. 5 is a graph showing the actual evaluation and photograph evaluation made for individual Ng. It was found that in the photograph evaluation, the face tended to be evaluated as having less depth compared to the evaluation of the corresponding actual face depending on the reflection rate of the reflection board placed under the face upon capturing the image of the face. Also, it was found that the gap between the photograph evaluation and the actual evaluation may be reduced by lowering the reflection rate upon image capture.

Further, it was found that the height of the nose and the shape of the face line are difficult to determine just based on the front view of the face because their appearance may vary depending on the direction of the chin, for example. Thus, it was found that the difference in evaluation with respect to actual face evaluation may be reduced by using photograph images corresponding to perspective views and side views of the face for the above evaluation items.

<1-5. Extraction of Facial Contour Analysis Index>

<1-5-1. Face Evaluation Test>

Figure 6:
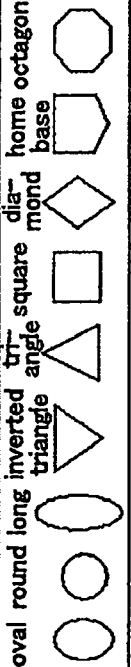
FIG. 6 is a diagram showing an exemplary contour evaluation sheet based on selected words.

It is noted that further considerations were made for extracting indices for analyzing facial contours. Specifically, an evaluation sheet containing the selected evaluation words was used to actually evaluate the faces of thirty four ordinary persons in their twenties through forties. FIG. 6 is a diagram showing an exemplary contour evaluation sheet based on the selected words. It is noted that the evaluations were conducted by four to six persons including the above four researchers, a cosmetologist, and a product development engineer. The number of evaluators was increased in order to reduce subjectivity and variations in the evaluations. However, confirmation was made beforehand with respect to the commonly understood definitions of the evaluations items so that variations in the evaluations may be minimized.

Also, it is noted that the above evaluations may be conducted using the face categorizing apparatus 10. Specifically, the evaluation sheet of FIG. 6 may be displayed on the display of the face categorizing apparatus 10, the evaluator may input predetermined evaluation information according to the above-described method using the input apparatus 10 to evaluate the face of an individual.

<1-5-2. Extraction of Index by Factor Analysis>

Next, numeric values representing the evaluation results obtained by the evaluators are input and an average evaluation score point for each of the evaluation items for each of the examined individuals was calculated using spread sheet software, for example. Also, factor analysis was performed using the obtained values. It is noted that factor analysis refers to a statistical scheme for reducing sets of variable information that are correlated to each other into a small number of underlying factors. It is noted that variable information may include the average evaluation score point of the evaluation items, for example. By performing factor analysis, evaluation items that are correlated may be integrated, and a reduced number of evaluation factors may be extracted.

It is noted that the factor analysis may be performed using commercial statistical analysis software such as SPSS (Statistical Package for Social Science) version 10.0J. For example, the software may be installed in a computer such as the face categorizing apparatus 10 to perform factor analysis. In the present example, principal component analysis was used as the extraction method and promax rotation was used as the rotation method in the factor analysis. As a result, four factors (contour evaluation factors) were extracted. FIG. 7 is a table showing the factor loading of the contour evaluation factors resulting from the above factor analysis.

As is shown in FIG. 7, a first factor (factor 1) of the factor loading includes evaluation items such as 'nose base line high-low' and 'chiseled-flat', and is thereby determined to be a factor of 'depth'. A second factor (factor 2) includes evaluation items such as 'cheeks pudgy-refined' and 'fleshy-bony', and is thereby determined to be a factor of 'flesh/bone structure'. A third factor (factor 3) includes evaluation items such as 'jaws flared-not' and 'cheeks wide-narrow', and is thereby determined to be a factor of 'width'. A fourth factor (factor 4) of includes evaluation items such as 'chin long-short', 'cheeks long-short', and 'chin large-small', and is thereby determined to be a factor of 'height'. It is noted that in the present example, the cumulative contribution rate as an index of the extent of descriptiveness was 63%.

Figure 8:
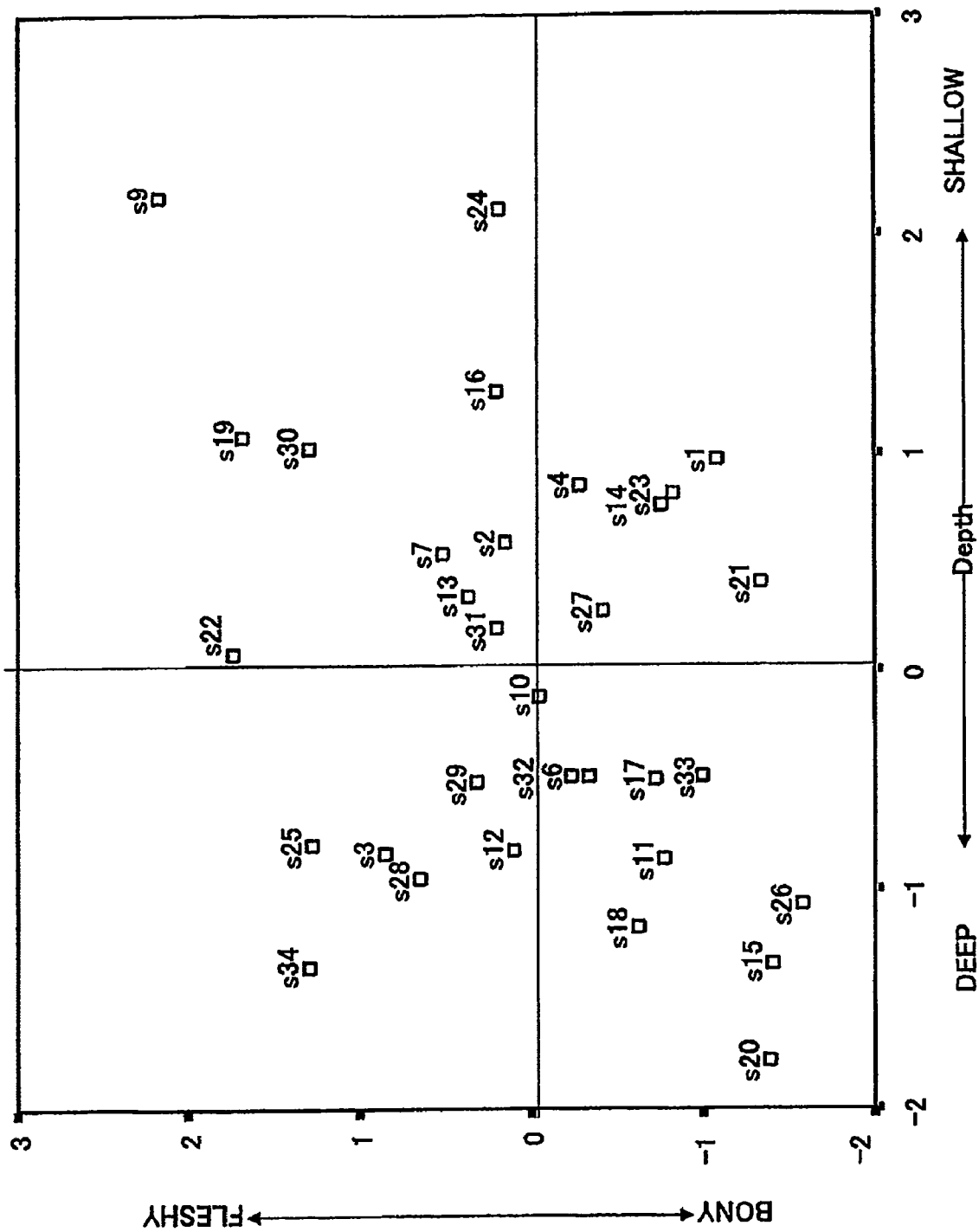
FIG. 8 is a graph plotting exemplary positions of examined subjects according to their scores for first and second factors.

FIG. 8 is an exemplary graph plotting the evaluation positions of the examined individuals according to their score points for the extracted first and second factors. By analyzing the distribution of the plotted points of FIG. 8, it may be appreciated that the examined individuals are positioned, categorized, and evaluated based on characteristic traits in their facial depth and facial flesh/bone structure.

Figure 9:
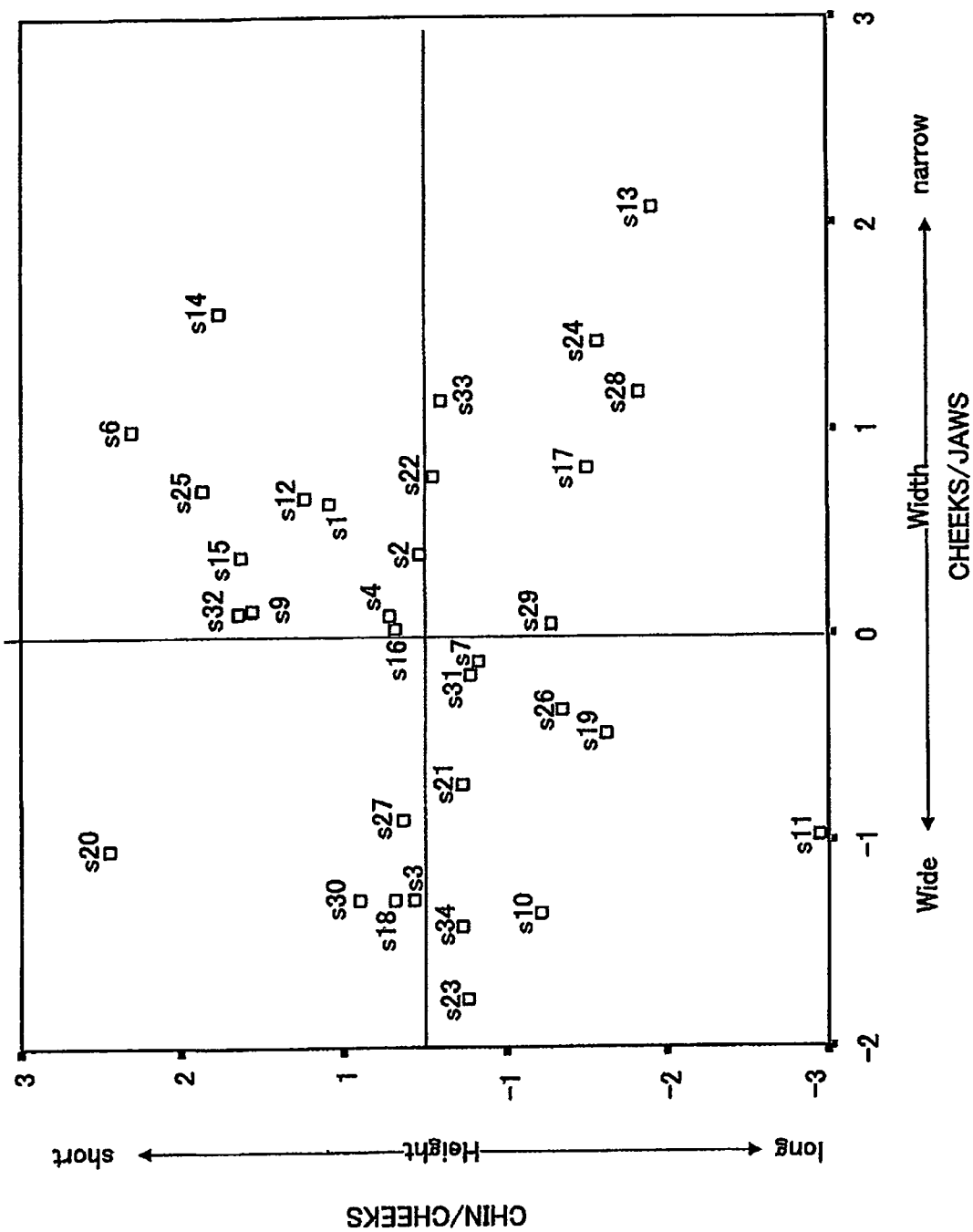
FIG. 9 is a graph plotting exemplary positions of examined subjects according to their scores for third and fourth factors.

FIG. 9 is an exemplary graph plotting the evaluation positions of the examined individuals according to their score points for the extracted third and fourth factors. In FIG. 9, the examined individuals are positioned, categorized, and evaluated based on the characteristic facial traits in relation to facial height and width. It is noted that the factors extracted in the present analysis are related to the indices considered in the above <1-2-2. Estimation of Evaluation Index> and may reflect aspects of the present evaluation.

It is noted that FIGS. 8 and 9 show the plotted evaluation positions of thirty two of the thirty four individuals S1-S34 in their twenties through forties that were subject to the present analysis. That is, the positions of two of the above individuals (i.e., S5 and S8) are not shown in the above graphs since their evaluations with regard to sagginess of the face line were too distantly located from the rest of the evaluation points.

<1-6. Generation of Categorization Map>

A categorization map according to an embodiment of the present invention may be generated based on the above findings. It is noted that in generating the categorization map in the present example, the obtained indices were organized further in consideration for enhancing general adaptability and convenience for beauty counseling. Specifically, the first factor (depth) and the second factor (flesh/bone structure) were integrated into one complex factor element representing facial depth/bone structure/fleshiness. Also, the third factor (length) and the fourth factor (height) were combined into one factor element representing facial space.

Figure 10:
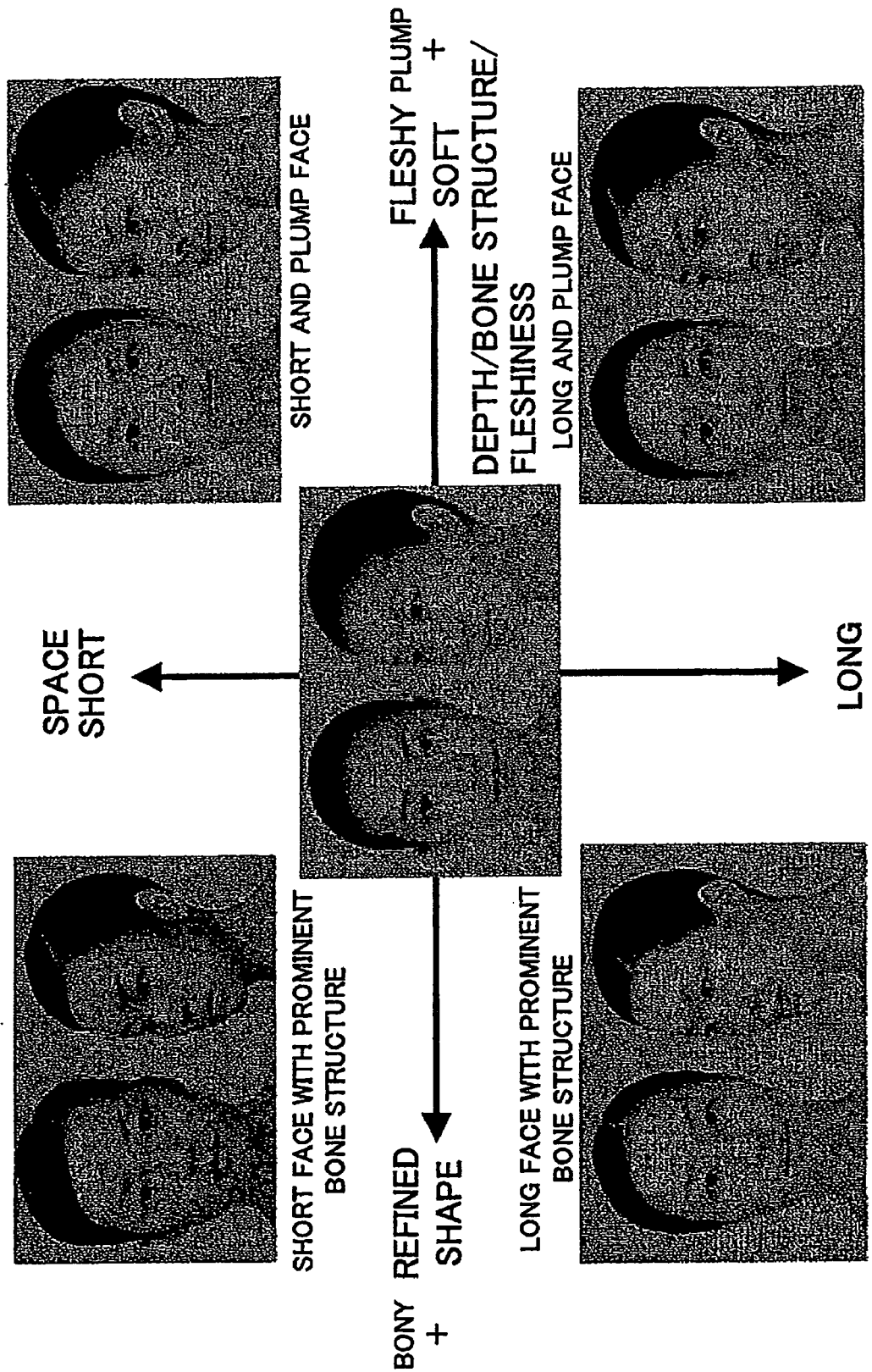
FIG. 10 is a diagram showing a categorization map according to a first embodiment of the present invention for categorizing a face based on facial space and facial depth/bone structure/fleshiness.

The two elements were then combined to be used as an evaluation index for categorizing a face. FIG. 10 is a diagram showing a categorization map according to a first embodiment of the present invention for categorizing a face based on facial space and facial depth/bone structure/fleshiness. The categorization map of FIG. 10 includes a first axis representing face types based on facial space balance, a second axis representing face types based on overall facial depth/bone structure/fleshiness, and a coordinate system having quadrants that are divided by the two axes and a predetermined face image having standard and ideal contours (e.g., average face image) provided at the center at which the two axes intersect.

It is noted that the first axis (vertical axis in FIG. 10) may represent the extent to which a relevant facial space such as the forehead, the cheeks, or the chin is vertically longer/shorter than that of the predetermined average face, for example. The second axis (horizontal axis in FIG. 10) represents how sharp and refined the face appears in one direction, and how plump and soft the face appears in the other direction. It is noted that the vertical-horizontal axis placement is not particularly limited to the present example.

It is noted that in FIG. 10, expressions (characters) describing the characteristics represented by the axes are indicated in order to facilitate face evaluation (analysis), and representative face images (photographs) distinctively showing the characteristics represented by the quadrants are generated by the face categorizing apparatus 10 using computer graphics to be arranged at their corresponding positions. In the present example, a front view and a perspective view of each representative face are generated and arranged at the corresponding quadrant. In this way, evaluation accuracy may be improved for certain evaluation items described above that may be vulnerable to evaluation degradation in the case where only a front view of the face is provided.

Figure 11:
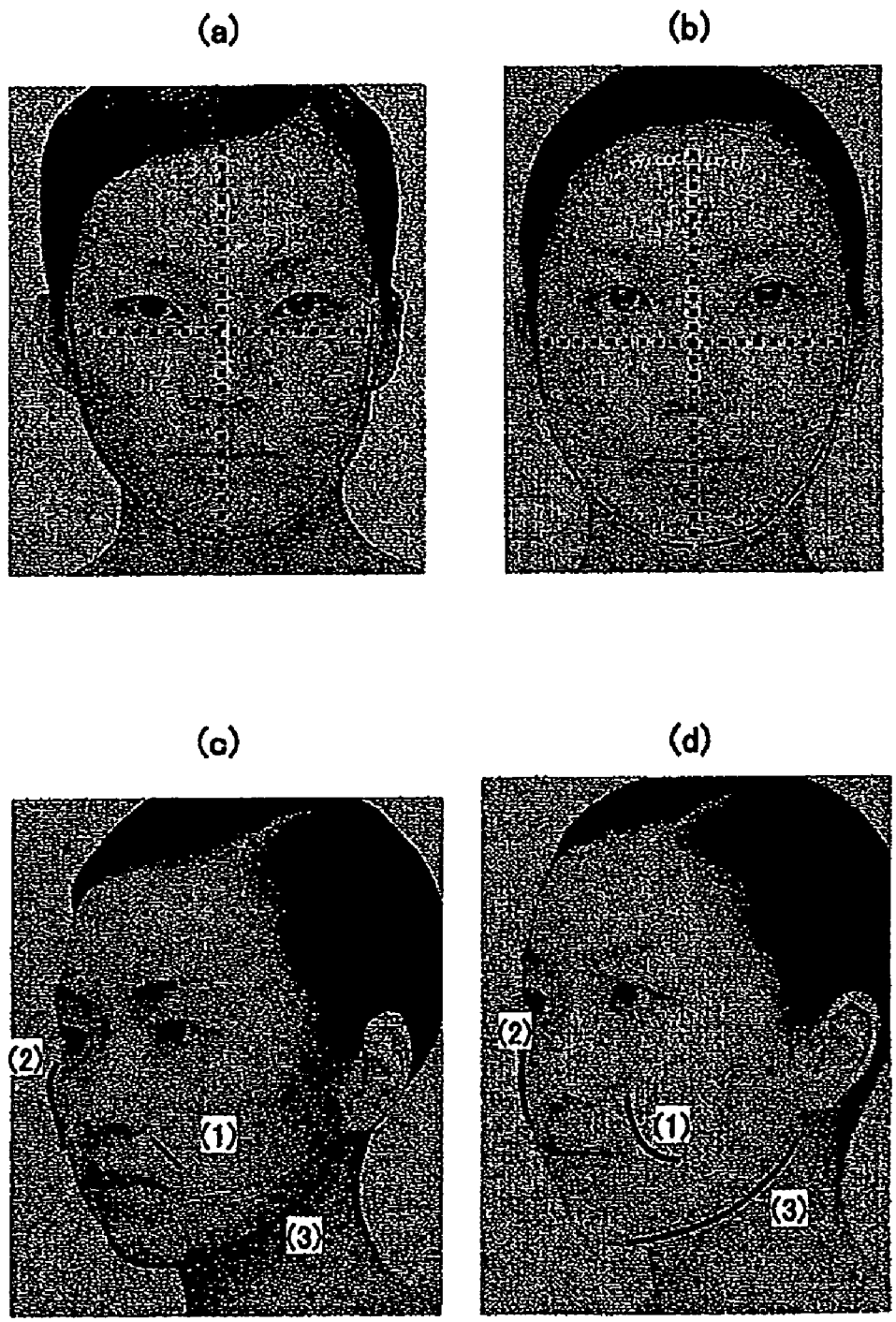
FIG. 11 is a diagram showing exemplary aspects to be considered upon performing evaluation based on indices according to an embodiment of the present invention.

FIG. 11 is a diagram showing exemplary aspects to be considered upon performing evaluation based on indices according to an embodiment of the present invention. FIG. 11(a) and FIG. 11(b) show examples of evaluating the space balance of the face. FIG. 11(c) and FIG. 11(d) show examples of evaluating the depth/bone structure/fleshiness of the face.

As is shown in FIG. 11(a) and FIG. 11(b), evaluation of the space balance is performed based on the length-to-width ratio of the outline of the face (outer face line). Specifically, the length-to-width ratio of an examined face is compared with the width-to-length ratio of 1:1.4 of the outer face line of the average face. For example, provided that the width is set to 1, if the length is less than 1.35 with respect to the width, the face may be determined to be short as is shown in FIG. 11(a). On the other hand, if the length is greater than 1.45 with respect to the width, the examined face may be determined to be long as is shown in FIG. 11(b). It is noted that appropriate numerical ranges to be used as evaluation criteria were obtained beforehand based on measurement results obtained from measuring and assessing the length-to-width ratios of the outer face lines of the thirty four examined subjects in their twenties to forties (the majority of which are in their twenties).

As is shown in FIG. 11(c) and FIG. 11(d), evaluation of the facial depth/bone structure/fleshiness is performed based on (1) the fleshiness of cheeks at the side of the nose, (2) cheek bones (2), and (3) the face line from the ear to the chin. Specifically, if 'cheek bones are angular', 'cheeks at the side of the nose are hollow', or 'the face line from the ear to the chin is linear', for example, a face may be determined to be 'refined and sharp'. On the other hand, if 'cheek bones and cheeks at the side of the nose are round', or 'the face line from the ear to the chin is curved', for example, a face may be determined to be 'fleshy and soft'.

In one embodiment, the face images of examined subjects used in the above-described evaluation may be captured by the image capture apparatus 18 and stored in the auxiliary storage apparatus 14 of the face categorizing apparatus 10 beforehand so that evaluation may be made by performing image analysis on the stored images.

<2. Adjustment of Contours>

<2-1. Desired Contours>

Next, examinations were performed to determine desirable facial contours that are perceived as beautiful in order to derive a method of adjusting facial contours to enhance beauty. In the present examination, the face of an examined subject was arranged to be in each of the following states: (a) bare face, (b) face wearing natural base makeup to cover color blotches of the skin, and (c) face having its contours adjusted by base makeup to simulate a balanced average oval face shape.

In the present examination, photographs of the face of six models with differing facial features wearing each of the above-described three different types of base makeup (or no makeup) were used in a survey conducted with respect to twenty females in their twenties. It is noted that FIG. 12 is a diagram showing exemplary evaluation items with regard to the appearance and overall impression of the face.

As is shown in FIG. 12, in the survey, subjects were asked to make evaluations on eight items related to the appearance of the face (i.e., forehead width, forehead depth, nose line, cheek fleshiness, cheek length, face line, chin protrusion, and eyes-nose balance) and three items related to the overall impression of the face (i.e., facial depth, beauty, and attractiveness). Also, the subjects were asked to rate the appropriateness of each of the items related to the appearance of the face.

The results of the survey revealed that by applying base makeup on the face, the appearance of the face with respect to the eyes-nose balance can be improved so that the overall face appears to have greater depth. In turn, evaluations with respect to overall beauty and attractiveness of the face can also be improved. It is noted that the highest evaluations were obtained when the faces had base makeup applied to simulate an oval face shape.

FIG. 13 is a diagram showing exemplary evaluation results with respect to the appearance of the face. Specifically, FIG. 13 shows average values of evaluations obtained with respect to the faces of the six models in their twenties wearing the different types of base makeup (or no makeup). As is shown in FIG. 13, higher evaluations were obtained when the contours of the face were adjusted using base makeup to simulate an oval face shape compared to evaluations for the face wearing no makeup (bare face) or the face wearing natural base makeup.

It is noted that the oval face shape base makeup is applied such that an inner face line passing through the lateral eyebrow ends of the face forms an oval shape similar to the face line of an average face.

<2-2. Face with Standard Balance>

An oval face shape and balanced facial features (so-called 'golden balance') are considered important criteria for a face to be generally perceived as beautiful. For example, according to the so-called golden balance, the eyes are desirably located at a position approximately ½ of the entire length of the head, the start of the eyebrows is desirably located at a position approximately ⅓ of the length extending from the hair line to the tip of the chin, and the nose is desirably located at a position approximately ⅔ of this length from the hair line.

It is known that the facial balance of an average face, which is created by averaging dimensional information and color information of face images (photographs) of plural persons using conventional image compositing techniques, becomes closer to this golden balance compared to the facial balance of the individual faces. Also, it is known that when the face images of ten persons are used to create an average face, the resulting average face does not greatly differ from the individual face images from which this average face is created (e.g., see Miwa NISHITANI et al. "Characteristics of Average Faces", 63$^{rd}$ Annual Meeting of The Japanese Psychological Association, August 1999).

Figure 14:
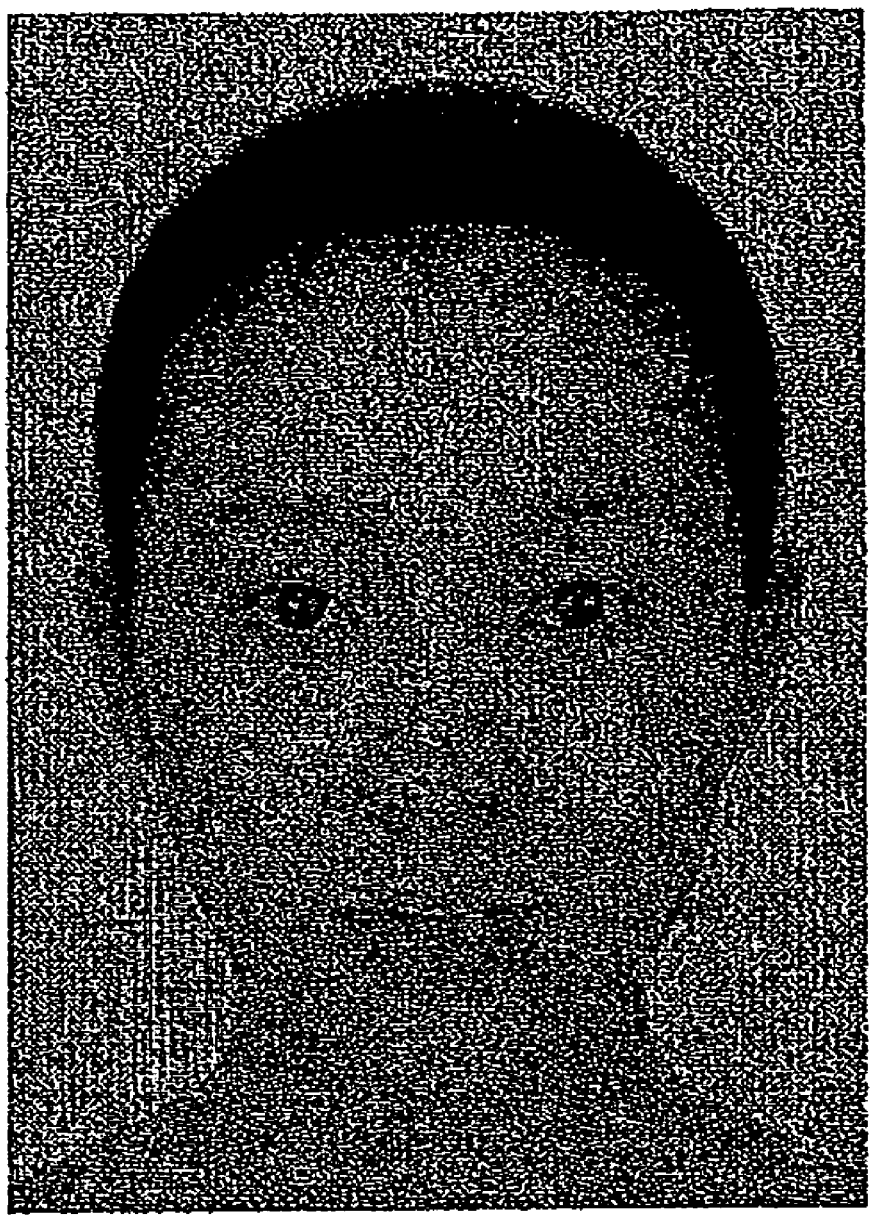
FIG. 14 is a diagram showing an exemplary average face created using face images of forty females.

FIG. 14 is a diagram showing an exemplary average face created using face images of forty females. The average face shown in FIG. 14 satisfies the above-described golden balance. It is noted that the golden balance is used as a standard balance as is described in detail below.

Figure 15:
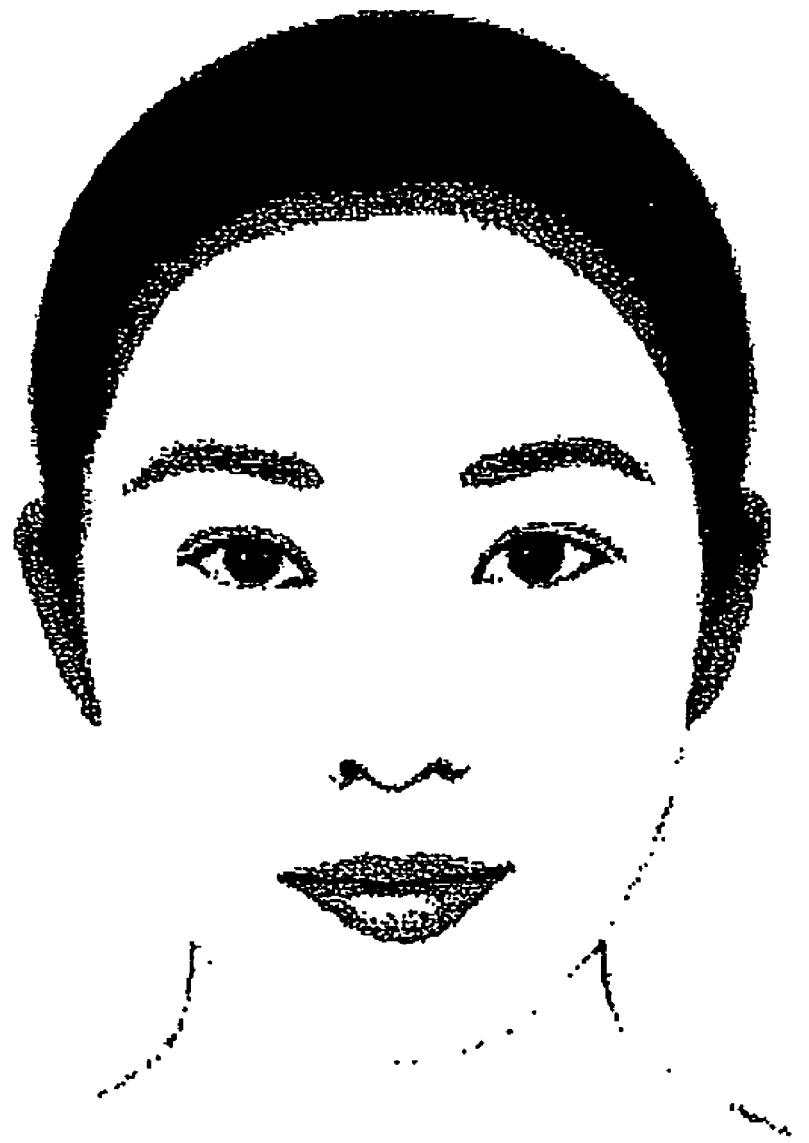
FIG. 15 is a diagram showing a face image obtained by removing depth/bone structure/fleshiness information from the average face.

FIG. 15 is a diagram showing a face image obtained by removing (skin color information and) depth/bone structure/fleshiness information from the average face shown in FIG. 14. It can be appreciated from FIG. 15 that depth/bone structure/fleshiness information has a significant influence on the perceived appearance of a face. Also, upon performing image analysis (monochrome posterization process) on the average face, it was determined that the inner face line also forms an oval shape similar to the outer face line of the average face.

Figure 16:
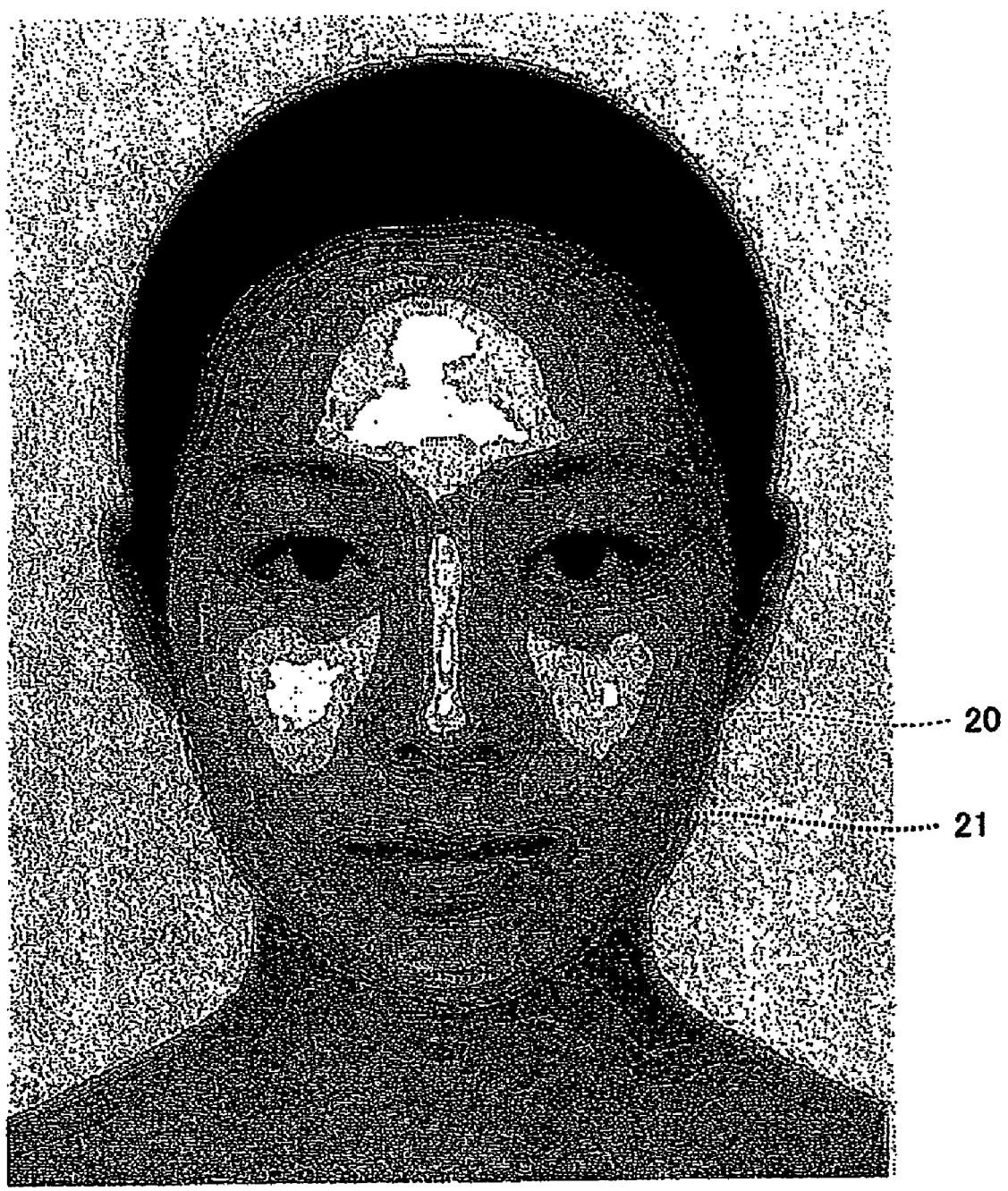
FIG. 16 is a diagram showing an exemplary shade analysis of the average face.

FIG. 16 is a diagram showing an exemplary image (contour) analysis of the average face. As is shown in FIG. 16, an inner face line 21 exists that is similar in shape to the oval shape of an outer face line 20. It can be appreciated from such an analysis that adjusting the contours of the face with makeup such that the inner face line appears to form an oval shape may be one new way of enhancing beauty of the face.

<3. Contour Adjustment—Best Oval Adjustment Method>

Figure 17:
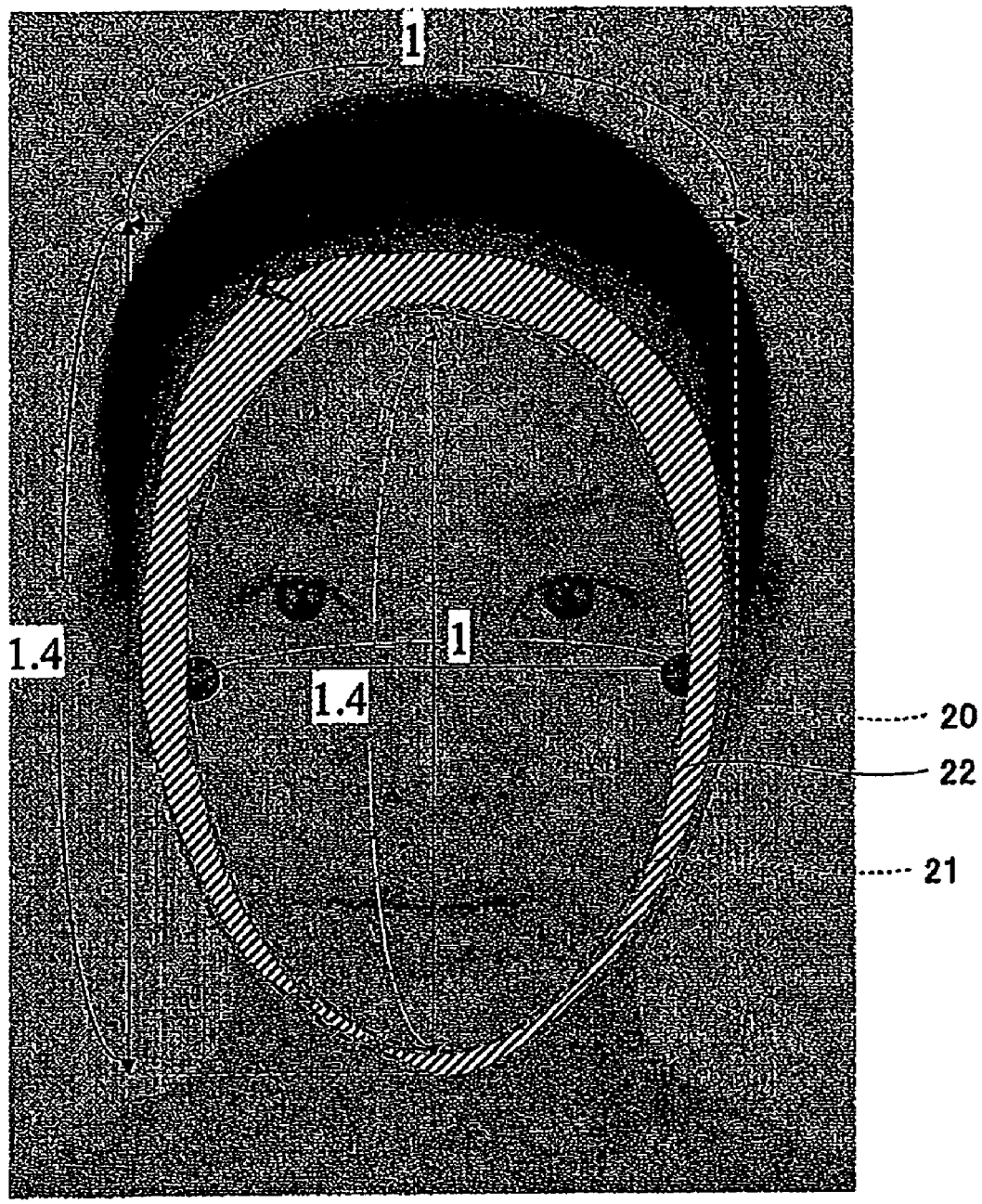
FIG. 17 is a diagram showing an exemplary best oval.

Next, the following hypothetical adjustment method has been established for adjusting contours of the face so that the inner face line forms an oval shape. It is noted that the shape of the outer face line and the inner face line of the average face are referred to as "best oval" hereinafter. Specifically, the outer face line forms an oval shape with a width-to-length ratio of 1:1.4 (standard outer face line). The inner face line of the average face also forms a similar oval shape with a width-to-length ratio of 1:1.4 that is reduced in size by a predetermined proportion from the size of the outer face line shape. FIG. 17 is a diagram illustrating an exemplary best oval shape.

As is described above, the outer face line 20 is configured so that it has a width-to-length ratio of 1:1.4. The outer face line is assumed to be an important factor determining the direction of space adjustment of the overall face. Also, as is shown in FIG. 17, in the case of defining the inner face line 21 in each individual face, first, the lateral width of the face extending between high portions of the left and right cheek bones is set to 1. Then, this width is used as a reference to arrange the length of the inner face line 21 to 1.4. In other words, the inner face line 21 is depicted as a best oval (extending from the lateral sides of the nose, passing the tail ends of the eyes and) coming into tangential contact with the eyebrow ends of the face. It is noted that a zone within the inner face line is subject to flesh/bone structure contour and spatial adjustment.

Also, a zone 22 (represented by hatched line portion in FIG. 17) is provided between the outer face line 20 and the inner face line 21 for giving natural depth to the appearance of the face. The zone 22 also corresponds to a depth adjustment zone for adjusting the appearance of the shapes of the outer face line 20 and the inner face line 21.

Figure 18:
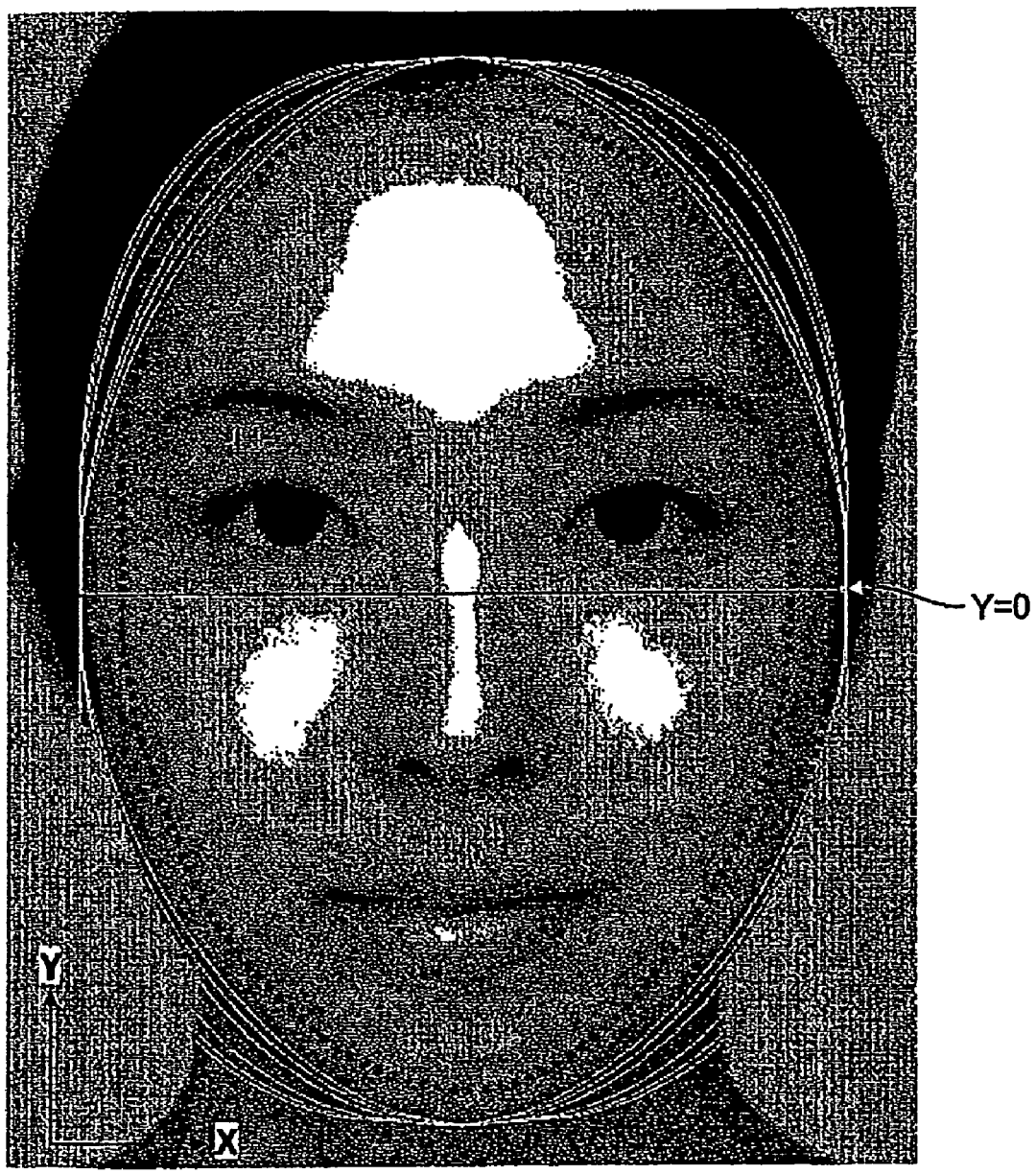
FIG. 18 is a diagram illustrating the shape of the best oval.

FIG. 18 is a diagram illustrating the shape of the best oval. Generally, a superellipse may be defined by the formula "$(X/a)^n+(Y/b)^n=1$", where 'a' denotes the long radius, 'b' denotes the short radius, and 'n' represents the curvature of the ellipse. In this case, the best oval has two halves of superellipse shapes corresponding to the upper half of the face shown in FIG. 18 ($Y>0$) and the lower half of the face shown in FIG. 18 ($Y<0$) that are joined together at line $Y=0$, where the variable b/a, indicating the oblateness of the superellipse, is arranged to be $b/a=1.4\pm0.05$ and the variable n, indicating the degree of curvature, is arranged to be $2.29 \leq n \leq 2.63$ where $Y>0$, and $1.75 \leq n \leq 2.00$ where $Y<0$.

Also, in adjusting the shape of the inner face line 21, it has been hypothesized that the direction of adjustment may vary depending on the position of a face on the above-described categorization map shown in FIG. 10. Specifically, in one aspect, when a face is determined to have a short spatial balance, adjustment may be made so that the face appears to have a longer spatial balance. On the other hand, if a face is determined to have a long spatial balance, adjustment may be made so that the face appears to have a shorter spatial balance.

In another aspect, in evaluating the facial depth/bone structure/fleshiness, when a face is determined to be soft and plump, adjustment may be made to add boniness to the appearance of the face. On the other hand, when a face is determined to be refined and sharp, adjustment may be made to soften the bony appearance of the face. The hypothetical adjustment method including such adjustment techniques was tested to develop the best oval adjustment method.

<4. Testing of Adjustment Method>

Next, the hypothetical adjustment method was used to apply makeup on the faces of persons that were subject to face evaluation in the above-described <1-5-1, Face Evaluation Test>. That is, face powder in various colors was used to adjust the contours of the subject faces. The colors of the face powder used included two focus colors for adding light and adjusting the bone structure/fleshiness of the face, and two modeling colors for adjusting the bone structure/fleshiness with shades to refine the contours of the face. It is noted that three different sets of focus colors were used according to the fairness of the skin of each of the subject faces. Also, it is noted that makeup was applied on the subject faces by beauty technicians.

Then, four to six evaluators evaluated the actual faces of the subjects wearing makeup applied in the above-described manner. It could be appreciated from such evaluation results that the appearance of the length and fleshiness of the cheeks can be adjusted and the appearance of the contours of the overall face may become closer to that of a standard face.

Figure 19A:
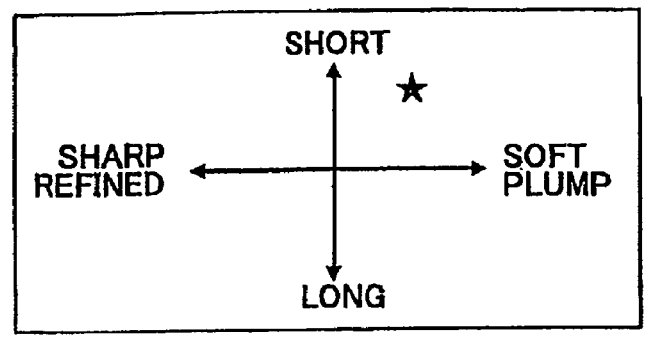
FIGS. 19A and 19B are diagrams showing an exemplary manner of applying face powder to the face.
Figure 19B:
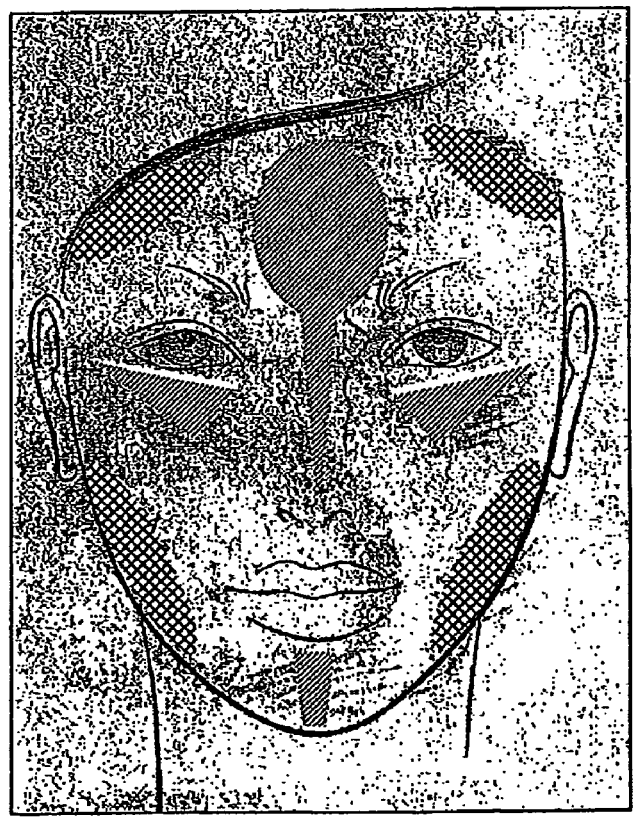

FIGS. 19A and 19B are diagrams showing an exemplary manner of applying face powder to the face. It is noted that FIGS. 19A and 19B illustrate an exemplary case of applying makeup on the face of subject A having a relatively short facial space balance and facial depth/bone structure/fleshiness characteristics that are soft and plump.

Also, it is noted that in the present example, focus colors are applied to portions of the face indicated by hatched lines in FIG. 19B and modeling colors are applied to portions of the face indicated by cross lines in FIG. 19B. By adjusting the contours of the face in this manner, the vertical space of the face may be adjusted to appear longer, the fleshy and plump appearance of the cheeks may be toned down, and depth/distinctiveness may be added to the face so that the inner face line may appear to be an oval shape. By adjusting the facial contours in the above-described manner so that the inner face line appears to be an oval shape, the outer face line may also appear to be an oval shape.

Specifically, makeup such as face powder may be used to adjust the appearance of the face so that the space within the inner face line and the flesh/bone structure may look more like those of an average face. For example, if the facial space is long, this may be adjusted to look shorter; and if boniness of the face stands out, this may be adjusted to so that the face looks more plump and fleshy. Also, modeling colors may be applied to the outer face line to add natural depth to the face. In such a procedure, the inner face line may be adjusted to appear oval.

Figure 20:
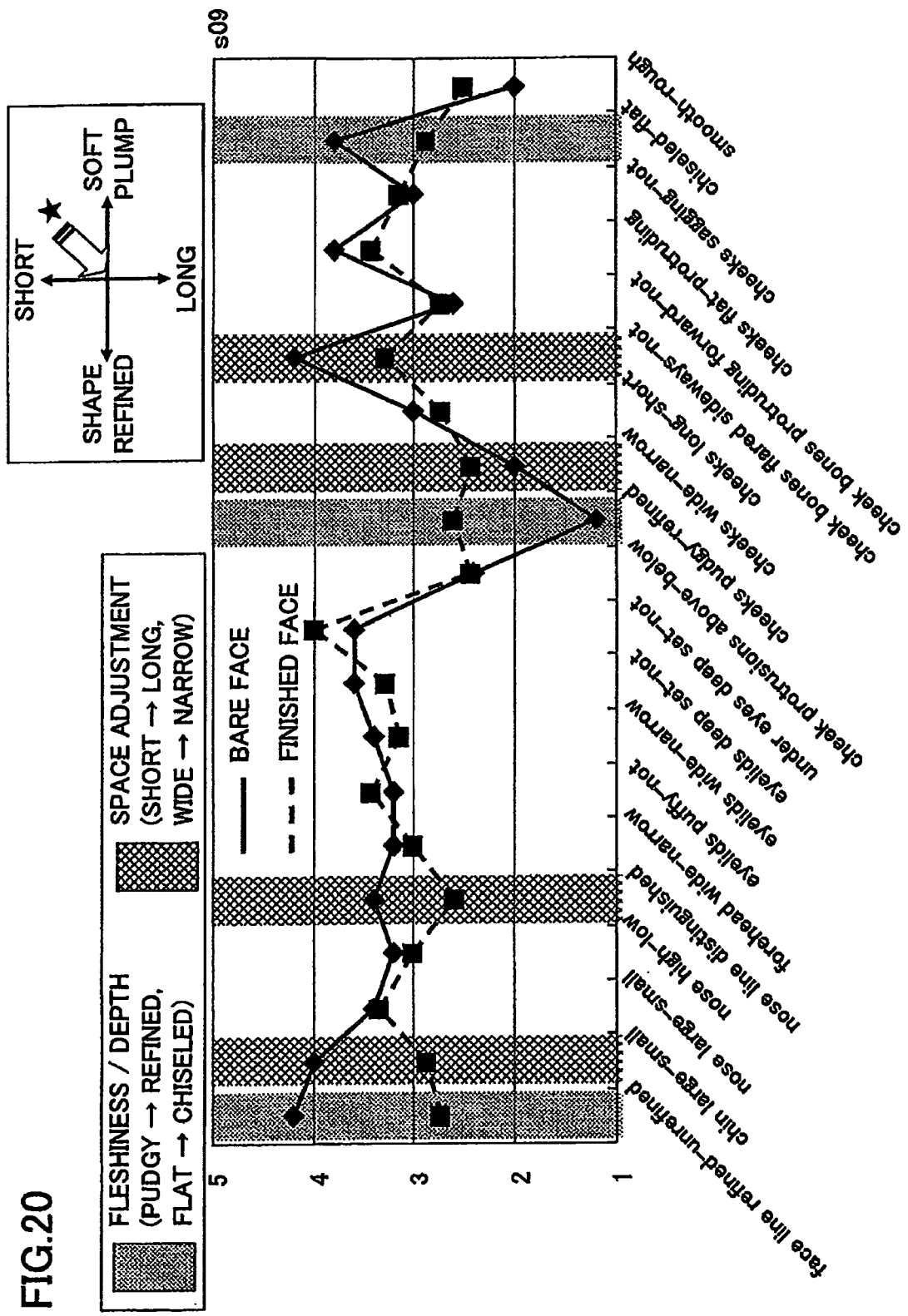
FIG. 20 is a diagram showing exemplary evaluations of the bare face of a subject and the face of the subject after having face powder applied.

FIG. 20 is a diagram showing exemplary evaluation results obtained from evaluating the face of the subject before applying makeup (bare face) and after applying makeup in the above-described manner (finished face). It is noted that FIG. 20 shows average values of evaluations made by four evaluators. As can be appreciated from FIG. 20, by applying makeup on the face in the above-described manner, the face line that does not look refined when it is bare may be adjusted to look more refined, pudgy cheeks may be adjusted to look more refined, and the depth and flesh/bone structure of the face may be adjusted to look more like that of a standard face. Also, the chin that looks small when the face is bare may be adjusted to look normal, the nose line may be distinguished, and the facial space balance may be adjusted.

<5. Adjustment Methods According to Face Types>

Figure 21:
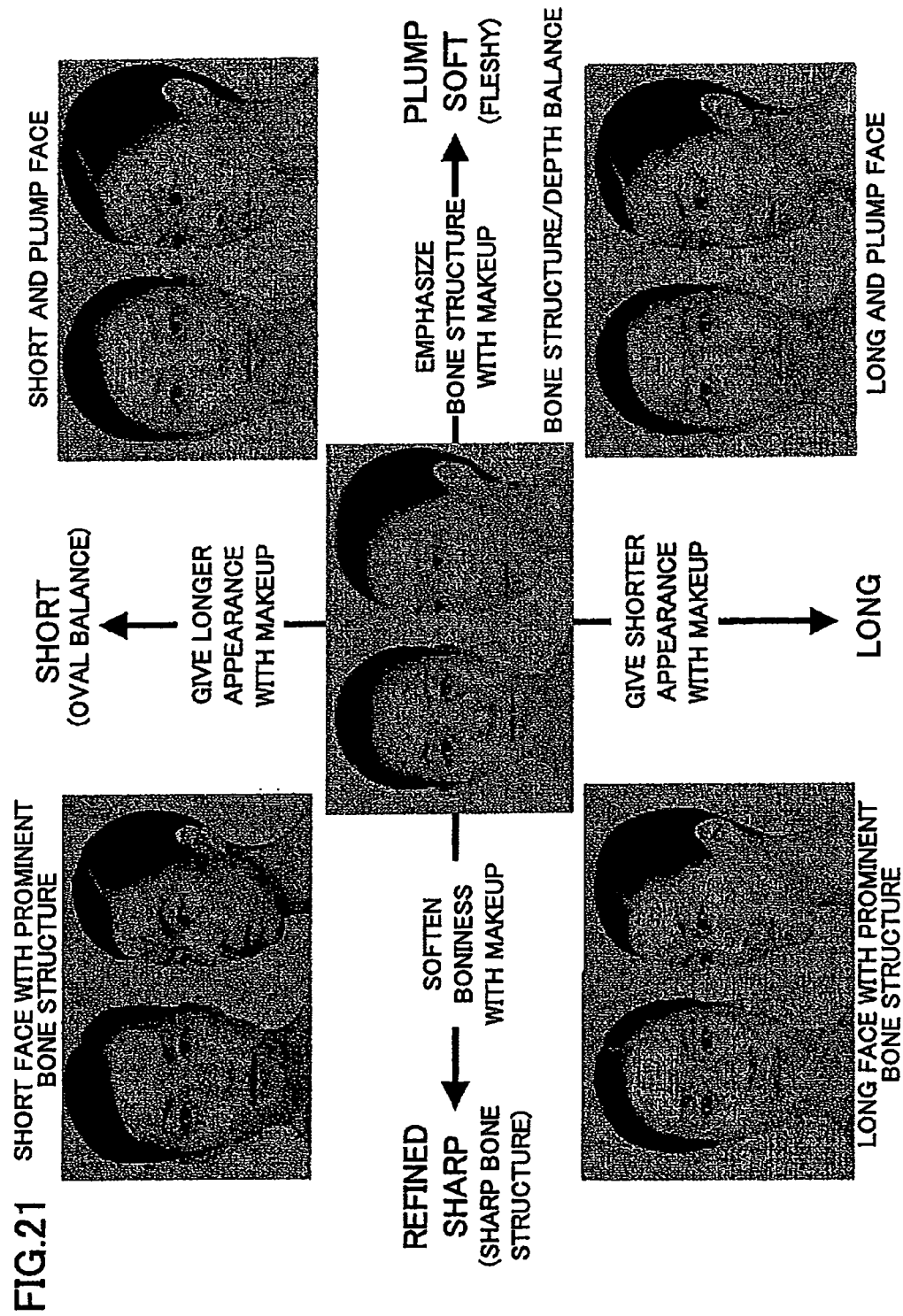
FIG. 21 is a diagram showing a categorization map according to a second embodiment for categorizing a face facial space and facial depth/bone structure/fleshiness.

As can be appreciated from the above descriptions, the direction of adjustment using makeup may vary depending on the position at which a subject face is mapped on the categorization map shown in FIG. 10. That is, each face may be mapped onto a corresponding position of the categorization map shown in FIG. 10, and the direction of adjustment for each face may be indicated in relation to the axes of this categorization map. FIG. 21 is a diagram showing another categorization map according to a second embodiment for categorizing a face based on facial space and facial depth/bone structure/fleshiness.

In the illustrated categorization map of FIG. 21, corresponding adjustment methods for adjusting facial contours with makeup are indicated for each of the quadrants that are defined by the two axes of the categorization map. By indicating the corresponding direction of adjustment of facial contours for each position on the categorization map, face evaluation and a corresponding adjustment method for adjusting facial contours may be presented in a more accurate manner, for example.

Figure 22:
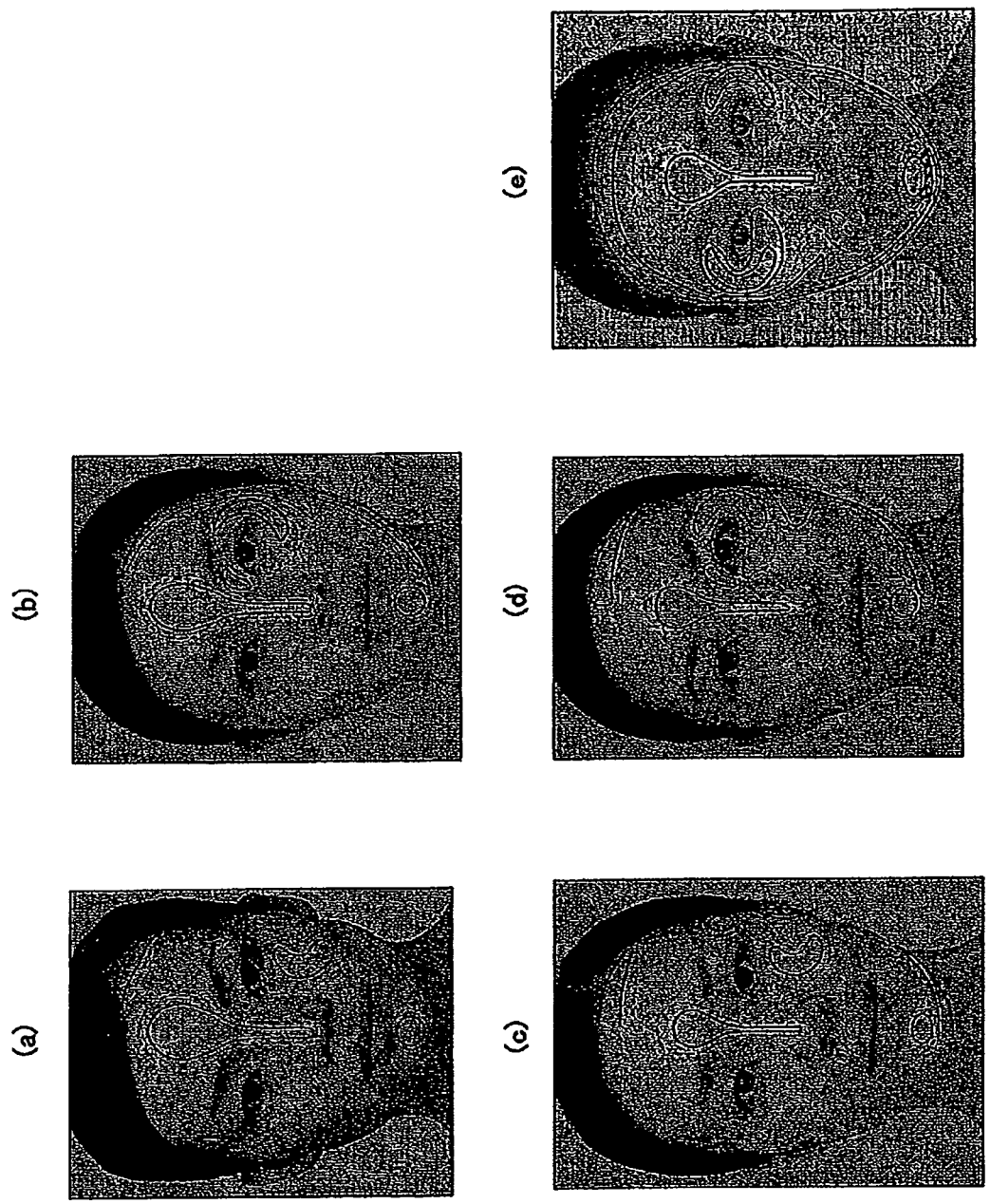
FIG. 22 is a diagram showing exemplary makeup adjustment methods according to different face type categories.

FIG. 22 is a diagram showing exemplary makeup adjustment methods according to different face type categories. In the case where a subject face is categorized into the 'short and refined' face type having a relatively short facial space balance and a prominent bone structure as shown in FIG. 22(a), makeup may be applied to make the facial space balance look longer and soften the boniness of the face. Specifically, the focusing color may be applied before the modeling color to soften the boniness of the face, give the cheeks a plump and round appearance, and make the face look longer. In applying the focusing color, the high portion of the cheek bone is avoided, and the focusing color is applied to the cheeks along a C shape extending downward from the inner side of the cheek to give a plump appearance. Also, the focusing color is applied to the temples to give a plumber appearance. Further, the focusing color is applied to extend over a relatively long range of the T zone. Then, the modeling color is applied at the corner of the forehead and the side of the chin to simulate the best oval shape.

In the case where a subject face is categorized into the 'short and plump' face type having a relatively short facial space balance and plump features as shown in FIG. 22(b), makeup may be applied to make the facial space balance look longer and emphasize the bone structure of the face. Specifically, the modeling color may be applied before the focusing color to emphasize the bone structure of the face, adjust the lateral width of the face, and make the face look longer. The modeling color is applied along the side portion of the face line to simulate the best oval shape. Also, the modeling color is applied to extend from a location below the cheek bone toward the center of the face. Further, the modeling color is applied to a portion below the start of the eyebrow. The focusing color is applied to the high portion of the cheek bone over a vertically longer range than its actual angle range. Also, the focusing color is applied to extend over a relatively long range of the T zone.

In the case where a subject face is categorized into the 'long and refined' face type having a relatively long facial space balance and a prominent bone structure as shown in FIG. 12(c), makeup may be applied to make the facial space balance look shorter and soften the boniness of the face. Specifically, the focusing color may be applied before the modeling color to soften the boniness of the face, add plumpness and roundness to the cheeks, and adjust the length of the face. In applying the focusing color, the high portion of the cheek is avoided, and the focusing color is applied along a C shape extending downward from the inner side of the cheek to give a plump appearance. Also, the focusing color is applied to extend over a relatively short range of the T zone. Then, in order to simulate the best oval shape, the modeling color is applied to relatively wide portions below the hair line and above the chin. Also, the modeling color is applied to adjust portions where the cheek bones stand out.

In the case where a subject face is categorized into the 'long and plump' face type with a relatively long facial space balance and plump features as shown in FIG. 12(d), makeup may be applied to make the facial space balance look shorter and emphasize the bone structure of the face. Specifically, the modeling color is applied before the focusing color to emphasize the bone structure, adjust the length of the face, and emphasize the lateral lines of the face. In order to simulate the best oval shape, the modeling color is applied to relatively wide areas of the forehead and the chin. Also, the modeling color is applied to extend laterally from a location below the cheek bone toward the center of the face. Further, the modeling color is applied to a portion below the start of the eyebrow. The focusing color is applied to extend vertically from the norm. Also, the focusing color is applied to the high portion of the cheek bone over a horizontally wider range than its actual angle range. Also, the focusing color is applied to extend over a relatively short range of the T zone.

In the case where a subject face is categorized by the above-described categorization map into a face type having standard and ideal facial contours (e.g., average face), makeup may be applied to the face according to predetermined makeup techniques. Specifically, in the case where the subject face is categorized into the 'standard and ideal' face type as shown in FIG. 22(e), the focusing color may be applied over areas extending from the high portion of the cheek toward a portion below the eyebrow arch, an area extending from the forehead to the nose line, and the tip portion of the chin. Also, another different focusing color is applied over the focusing color used in the above-described procedure in order to set the makeup to the tone of the skin. The modeling color is applied along the outline of the face, such as the face line, the tip of the chin, and the hair line, and below the cheek bones. Also, another modeling color that is different from the modeling color used in the above-described procedure is applied over and around the previously applied modeling color and the inner sides of the outline portions in order to set the makeup to the tone of the skin.

As can be appreciated from the above descriptions, best oval adjustment using makeup may be performed based on face categorization by indicating the direction of adjustment of facial contours for each face type corresponding to a position on a categorization map. Also, it is noted that the images shown in FIG. 22 and/or the above-described makeup adjustment methods for each face type category may be displayed on the screen of the face categorizing apparatus 10 or printed out on a sheet of paper, for example.

<6. Receptivity of Adjustment Method>

Then, subjects were asked to evaluate the makeup results obtained by using the best oval adjustment method as described above. FIG. 23 is a diagram showing exemplary evaluations made by the subjects with respect to the makeup results using the above-described best oval adjustment method. As can be appreciated from FIG. 23, favorable evaluations were obtained for the makeup results of using the best oval adjustment method as described above. Specifically, out of twenty-five (25) subjects, twenty-three (23) evaluated the makeup results as favorable (i.e., eleven subjects evaluated the results as 'favorable' and twelve subjects evaluated the results as 'rather favorable'); two subjects evaluated the makeup results as neither favorable nor unfavorable, and none of the subjects evaluated the makeup results as unfavorable.

Also, the subjects were asked to compare the present makeup results obtained using the above best oval adjustment method with base makeup that they usually wear. In this case, fifteen (15) subjects evaluated the present makeup result as more favorable than the usual result, and seven subjects evaluated the present result as rather favorable than the usual result; that is, twenty-two (22) out of a total of twenty-five (25) subjects made favorable evaluations with respect to the makeup results obtained using the best oval method as described above. It can be appreciated from such findings that the present adjustment method may be generally accepted as having favorable results.

<Makeup Procedures Using Categorization Map>

In the following, an exemplary sequence of makeup procedures, from categorizing the face of an examined subject to indicating a corresponding makeup adjustment method based on the categorization result, are described which procedures are performed by the face categorizing apparatus 10 using the categorization map according to an embodiment of the present invention.

Figure 24:
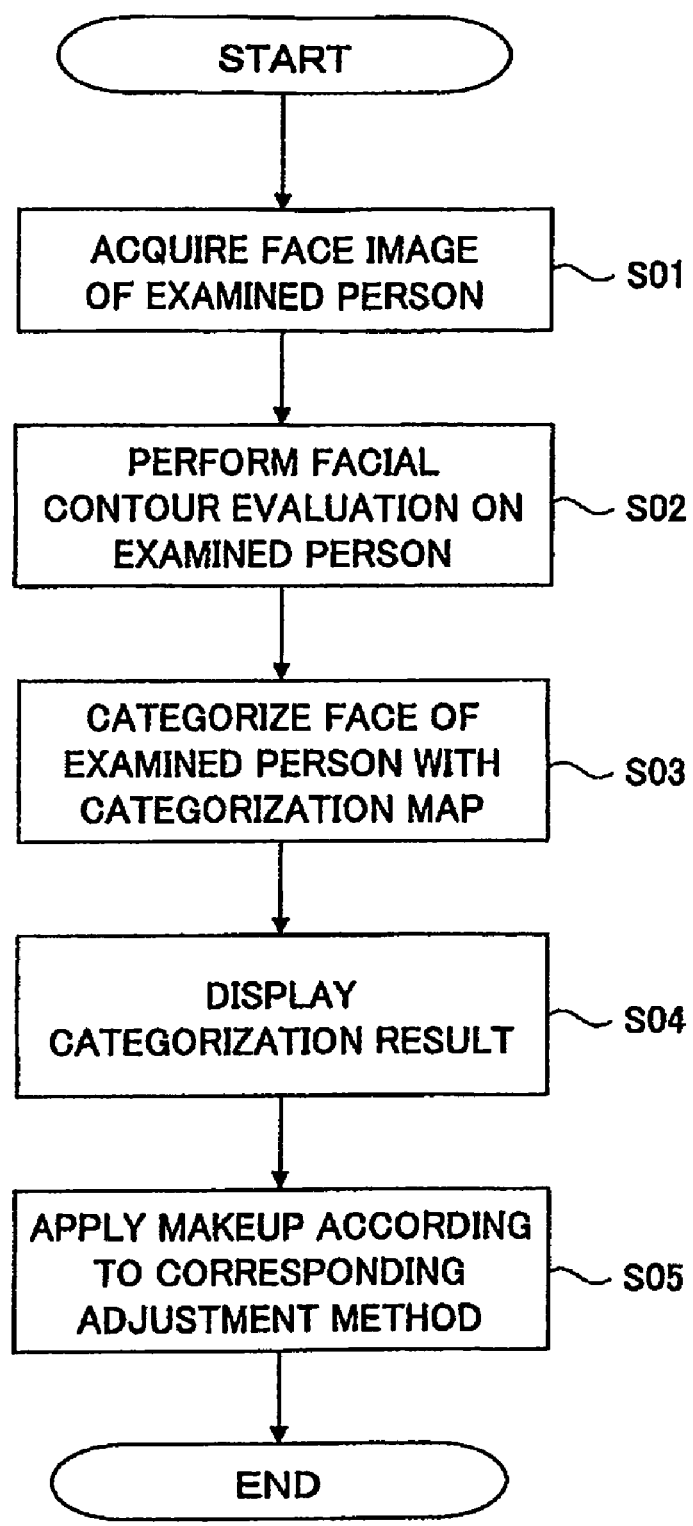
FIG. 24 is a flowchart illustrating exemplary makeup procedures using a categorization map according to an embodiment of the present invention.

FIG. 24 is a flowchart illustrating exemplary makeup procedures using a categorization map according to an embodiment of the present invention.

According to FIG. 24, first, a face image of an examined subject is acquired (S01). Specifically, in step S01, a front view of the face of the examined subject and a forty-five-degree angle perspective view of the face may be captured by the image capturing apparatus 18 as face images, for example.

Then, the facial contours of the examined subject are evaluated based on the acquired image data (S02). Specifically, as is shown in FIG. 11, a determination may be made as to whether the face is longer/shorter or bonier/plumper than a standard face line, for example.

Then, based on the categorization result obtained in step S02, the face of the examined subject is categorized using the categorization map according to an embodiment of the present invention, such as that shown in FIG. 10 or FIG. 21, to determine the corresponding face type category to which the face of the examined subject belongs (S03). Specifically, the face categorization may be performed by compiling the above-described items of evaluation information related to the face of the examined subject, comparing this result with pre-designated values, and determining a corresponding position within the categorization map indicating the corresponding face type category based on the comparison result, for example.

Then, the categorization result may be indicated on a display, for example (S04). Specifically, the categorization map as shown in FIG. 10 or FIG. 21 may be indicated on the display and the categorization result may be plotted at a corresponding position within the categorization map, for example. Also, the corresponding adjustment method of adjusting facial contours with makeup for each face type category may be indicated on the display, for example. Further, the categorization result may be printed out on a sheet of paper and provided to the examined subject, for example.

Then, the examined subject may apply makeup according to the indicated adjustment method, for example (S05). Specifically, as is described above, adjustments may be made with makeup so that the inner face line appears to have the best oval shape. For example, corresponding makeup techniques such as those shown in FIGS. 19A and 19B may be stored beforehand for each category and an adjustment method corresponding to the categorization result obtained with respect to the face of the examined subject may be indicated.

In this way, makeup techniques for adjusting facial contours so that the inner face line appears to have a shape similar to the outline (outer face line) of a standard face may be provided as guidelines to the examined subject.

According to certain aspects of the present invention, contours of the face may be accurately categorized. Also, suitable makeup adjustments may be made according to the face type into which the face of an examined subject is categorized.

Specifically, a method of categorizing the contours of the face according to the length of the face and the flesh/bone structure of the face (particularly the cheeks) and a categorization map for conducting such categorization may be used to indicate a suitable adjustment method for adjusting the contours of the face according to the face type into which a face is categorized.

Also, in adjusting the contours of the face, an inner face line that is similar in shape to the outline (outer face line) of a standard face is used. In this way, the contours of the face may be accurately categorized according to each face type. Also, the overall balance of the face may be adjusted so that favorable evaluations may be obtained with respect to the makeup result.

Also, the categorization map may be used as a cosmetic tool for applying makeup; namely, the categorization map may be used as a guideline providing directions for applying makeup to achieve a desired impression of the face. By using such a categorization map, a suitable makeup adjustment method may be provided without requiring skills of an expert, for example.

In applying base makeup, the appearance of the face line may be adjusted to an oval shape so that the overall face may be balanced. Specifically, the face line may be adjusted to the so-called 'best oval' having an oval-shaped inner face line as well as an oval-shaped outer face line.

That is, according to an embodiment of the present invention, by using the inner face line (superellipse), a target makeup technique may be indicated without having to categorize the contours of the face. It is noted that the target makeup technique using the inner face line as a guideline does not rely on the contours of individual faces and may be unambiguously determined and universally applied to all face types.

Also, makeup adjustment according to an embodiment of the present invention involves categorizing the contours of the face beforehand so that shades and contours may be adjusted according to the features of the face and appropriate adjustment of facial contours may be performed.

Although the present invention is shown and described with respect to certain preferred embodiments, the present invention is not limited to such embodiments and includes equivalents and modifications that may be conceived within the scope of the claims.

The present application is based on and claims the benefit of the earlier filing date of Japanese Patent. Application No. 2005-348320 filed on Dec. 1, 2005, the entire contents of which are hereby incorporated by reference.

The invention claimed is:

1. A face categorizing method for categorizing contours of a face of an examined subject, the method comprising:
an evaluation step of evaluating the face of the examined subject based on at least two indices including a facial space index and an overall facial depth/bone structure/fleshiness index;
a categorization step of categorizing the face of the examined subject into one of at least four predetermined types of categories based on a result of the evaluation made by the evaluation step,
wherein the facial space index indicates whether a spatial proportion of the face is long or short, and the overall facial depth/bone structure/fleshiness index indicates whether depth/bone structure/fleshiness of the face is sharp and refined or plump and soft, and
wherein the overall facial depth/bone structure/fleshiness index is evaluated based on fleshiness of cheeks at sides of nose, cheek bones and a face line from an ear to chin of the examined subject.

2. The face categorizing method as claimed in claim 1, wherein the evaluation step includes using a predetermined average face and at least four representative faces each representing said at least four predetermined types of categories for evaluating the face of the examined subject.

3. The face categorizing method as claimed in claim 2, wherein the evaluation step includes evaluating a scale of a length to width ratio of the facial space reflecting a length to width balance of a forehead, cheeks, or a chin of the face with respect to the average face; and evaluating the facial depth/bone structure/fleshiness by determining a scale of how refined and sharp or how plump and soft the face appears.

4. The face categorizing method as claimed in claim 1, further comprising:
an indication step of indicating a categorization result of categorizing the face by the categorization step on a map having the four types of categories positioned at corresponding quadrants of a plane coordinate system, and indicating an adjustment method for each of the four types of categories for adjusting contours to resemble contours of a predetermined average face using makeup.

5. The face categorizing method as claimed in claim 4, wherein the adjustment method uses a shape having a width to length ratio of 1:1.35-1.45 which shape is similar to an outer shape of the average face and is scaled down by a predetermined scale factor.

6. A face categorizing apparatus for categorizing contours of a face of an examined subject, the apparatus comprising:
image capturing means for capturing a face image of the face of the examined subject;
control means for controlling operations for categorizing the face of the captured face image into one of at least four predetermined types of categories based on at least two indices including a facial space index and an overall facial depth/bone structure/fleshiness index; and
indication means for indicating a categorization result of categorizing the face by the control means on a map having the four predetermined types of categories positioned at corresponding quadrants of a plane coordinate system,
wherein the facial space index indicates whether a spatial proportion of the face is long or short, and the overall facial depth/bone structure/fleshiness index indicates whether depth/bone structure/fleshiness of the face is sharp and refined or plump and soft, and
wherein the overall facial depth/bone structure/fleshiness index is evaluated based on fleshiness of cheeks at sides of nose, cheek bones and a face line from an ear to chin of the examined subject.

7. The face categorizing apparatus as claimed in claim 6, wherein the control means uses a predetermined average face and at least four representative faces each representing said at least four predetermined types of categories for categorizing the face of the examined subject.

8. The face categorizing apparatus as claimed in claim 7, wherein the control means evaluates a scale of a length to width ratio of the facial space reflecting a length to width balance of a forehead, cheeks, or a chin of the face with respect to the average face; and evaluates the facial depth/bone structure/fleshiness by determining a scale of how refined and sharp or how plump and soft the face appears.

9. The face categorizing apparatus as claimed in claim 7, wherein the indication means indicates an adjustment method for each of the four types of categories for adjusting contours to resemble contours of a predetermined average face using makeup according to the categorization result.

10. The face categorizing apparatus as claimed in claim 9, wherein the adjustment method uses a shape having a width to length ratio of 1:1.354.45 which shape is similar to an outer shape of the average face and is scaled down by a predetermined scale factor.

11. A face categorization map comprising:
   a first axis representing face types according to a facial space index for a face;
   a second axis representing face types according to an overall facial depth/bone structure/fleshiness index for the face; and
   a coordinate system having quadrants divided by the first and second axes, and a predetermined face image having standard and ideal contours arranged at a center where the first and second axes intersect,
   wherein the facial space index indicates whether a spatial proportion of the face is long or short, and the overall facial depth/bone structure/fleshiness index indicates whether depth/bone structure/fleshiness of the face is sharp and refined or plump and soft, and
   wherein the overall facial depth/bone structure/fleshiness index is evaluated based on fleshiness of cheeks at sides of nose, cheek bones and a face line from an ear to chin of the examined subject.

12. The face categorization map as claimed in claim 11, wherein
   the first axis represents a scale of a length to width ratio of the facial space reflecting a length to width balance of a forehead, cheeks, or chin of the face with respect to a predetermined average face; and
   the second axis represents, in one direction, a scale of how refined and sharp the face appears; and, in another direction, a scale of how plump and soft the face appears with respect to the facial depth/bone structure/fleshiness.

13. The face categorization map as claimed in claim 11, wherein a corresponding adjustment method for adjusting contours to resemble contours of the predetermined face image using makeup is indicated at each of the quadrants that are divided by the first and second axes.

14. A computer-readable medium containing a face categorizing program that is configured to be executed by a computer to perform:
   an evaluation step of evaluating the face of the examined subject based on at least two indices including a facial space index and an overall facial depth/bone structure/ fleshiness index;
   a categorization step of categorizing the face of the examined subject into one of at least four predetermined types of categories based on a result of the evaluation made by the evaluation step,
   wherein the facial space index indicates whether a spatial proportion of the face is long or short, and the overall facial depth/bone structure/fleshiness index indicates whether depth/bone structure/fleshiness of the face is sharp and refined or plump and soft, and
   wherein the overall facial depth/bone structure/fleshiness index is evaluated based on fleshiness of cheeks at sides of nose, cheek bones and a face line from an ear to chin of the examined subject.

* * * * *